United States Patent Office 3,769,271
Patented Oct. 30, 1973

3,769,271
N-PROTECTED AMINO ACIDS AND PEPTIDES
George Lee Southard, Indianapolis, Ind., assignor to Eli
Lilly and Company, Indianapolis, Ind.
No Drawing. Filed Apr. 15, 1971, Ser. No. 134,430
Int. Cl. C07c 103/52; C07g 7/00
U.S. Cl. 260—112.5                    27 Claims

ABSTRACT OF THE DISCLOSURE

Novel N-protected amino acids represented by the formula

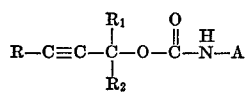

where R is H, Cl, phenyl or substituted phenyl; $R_1$ is H or $C_1$-$C_4$ alkyl, $R_2$ is $C_1$-$C_4$ alkyl and A is the residue of an amino acid, are obtained by reacting an acetylenic chloro or fluoroformate ester or a phenyl carbonate ester with amino acids. N-protected amino acids are employed in method of peptide synthesis comprising coupling an N-protected amino acid or an active ester thereof with amino acids or peptides to provide N-terminal protected peptides. Hydrogenolysis of N-protected peptide products over 5 percent Pd/C at neutral or acidic pH affords desired peptides. Acetylenic N-protecting groups provided are readily cleaved in the presence of amino acids or peptides having sulfur containing group.

BACKGROUND OF THE INVENTION

Amino acids and peptides are important biological substances. The amino acids are the building blocks employed in the synthesis of peptides. The peptides themselves are obtainable from natural sources. However, peptides are difficult to obtain in a high state of purity from such sources. Accordingly, the chemical synthesis of peptides has been the object of extensive experimental investigation. Necessarily, the synthesis of these peptides involves the use of amino acids.

In the synthesis of peptides, the amino group of one amino acid can be reacted with the carboxyl group of another amino acid to form, for example, a dipeptide as illustrated by the following simplified reaction scheme.

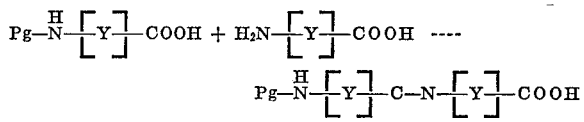

where Pg is an amino protecting group and Y is the remaining residue of an amino acid.

The amino acids are polyfunctional compounds possessing both an amino group and a carboxyl group and in many instances additional reactive functional groups such as the sulfhydryl group, the hydroxyl group or an additional amino group. Because of the polyfunctional character of amino acids, it is necessary to block or protect the reactive functional groups such as the carboxyl, amino hydroxyl and sulfhydryl groups which are not to participate in the coupling reaction. Hence, prior to the coupling of amino acids with other amino acids or amino peptides in the synthesis of a dipeptide or polypeptide, it is desirable to render inactive or protect all functionalities in a given amino acid or peptide which are not to be used in the coupling process. If other reactive functionalities are left reactive, that is, are not blocked or protected, yields of the desired peptide will be lower and purification will be made more difficult because of competing reactions involving these unprotected groups. A wide variety of protecting groups have been developed and employed in the synthesis of peptides. It is necessary that the protecting group react readily with the desired functional group of the amino acid before amide formation and that it be easily removed from the resulting peptide after coupling without simultaneous cleavage of the newly formed amide linkage.

Two types of protecting groups are employed in peptide synthesis: (1) the C-terminal protecting groups—those groups which render the acid portion of the amino acid inactive, for example, alcohol derivatives wherein the carboxylic acid function is inactivated by conversion into an ester, and (2) the N-terminal protecting groups, those groups which render the amine portion unreactive, such as the benzyloxycarbonyl, trityl, tert-butyloxycarbonyl and the like groups. It is with the N-terminal or amino protecting groups that this invention is principally concerned.

DESCRIPTION OF PRIOR ART

The commonly employed amino protecting groups are generally removed from the resulting peptide, following the coupling reaction, by either acid or base hydrolysis or by catalytic hydrogenolysis. A preferred method for removal of such amino blocking groups is the catalytic hydrogenolysis method. However, currently employed amino blocking groups suffer from the disadvantage that their removal by the hydrogenolysis method is frequently hindered by sulfur containing functional groups within the molecule. Commonly employed amino blocking groups which are removable by catalytic hydrogenolysis are the benzyloxycarbonyl group and the tert-butyloxycarbonyl group. Such amino blocking groups have not been removed with sufficient ease to overcome the poisoning effect or catalyst binding effect of the sulfhydryl group or alkylmercapto groups present in the same molecule. Therefore, an amino protecting group which can be easily removed by catalytic hydrogenolysis in the presence of other blocking groups, and in particular, sulfur containing groups such as the sulfhydryl and alkylmercapto groups, would be a significant advance in the art of peptide synthesis.

Recently the N - (3,5 - dimethoxybenzyloxycarbonyl)-group has been described as a useful N-protecting group for amino acids, its removal being effected by ultraviolet radiation (U.S. Pat. 3,532,736).

The adamantyloxycarbonyl amino protecting group is described in U.S. Pat. 3,510,504.

Amino protecting groups containing an acetylenic bond have not been previously employed. The chloroformate ester of dimethylethynyl carbinol has been prepared and reacted with aniline to form the corresponding phenyl carbamate, J. Org. Chem. 35, 3293 (1970). It has been reported that catalytic hydrogenation of the phenyl carbamate over palladium on carbon catalyst resulted in an excellent yield of tertiary amyl phenyl carbamate. No reports in the literature describe the hydrogenolysis of an acetylenic blocking function from the amino group of amino acids.

Carbonate esters of tertiary acetylenic carbinols have been previously described in U.S. Pat. No. 3,348,939. Also the simple carbamate derivatives of certain acetylenic carbinols such as 3-methyl-3-ol-pentyn-1 carbamate are described in U.S. Pat. No. 3,152,167 and U.S. Pat. No. 2,816,910. Likewise certain chloroalkylacetylenic carbinol carbamates are described in U.S. Pat. No. 3,062,870.

SUMMARY OF THE INVENTION

This invention relates to acetylenic active esters which are useful as amino protecting groups. In particular, this invention relates to chloroformate esters, phenyl and substituted phenyl carbonate esters of certain secondary and tertiary acetylenic carbinols which react readily with amino acids and amino peptides to provide an alkynylcarbinyloxycarbonyl protected amino function. This invention further relates to protected amino acids and protected amino peptides wherein the protecting group is an alkynylcarbinyloxycarbonyl protecting group. In another of its aspects the present invention relates to an improved process for the preparation of peptides.

According to the present invention, a chloro or fluoroformate ester of an acetylenic carbinol, preferably a tertiary acetylenic carbinol such as 3-methyl-1-butyn-3-yl chloroformate, is reacted with an amino acid to provide an alkynylcarbinyloxycarbonyl protected amino acid.

Likewise, the phenyl and halo-substituted phenyl carbonate esters of acetylenic carbinols are reacted with the amino group in amino acids to provide the alkynylcarbinyloxycarbonyl protected amino acid.

The haloformate esters and the phenyl carbonate esters of the acetylenic carbinols are active esters which react readily with the amino group of amino acids to form the N-blocked or N-protected amino acid as illustrated in the following reacting scheme,

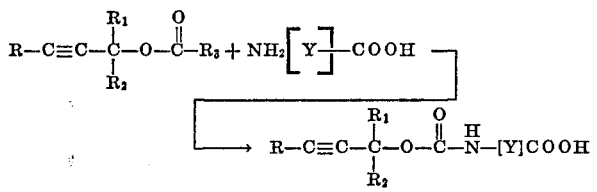

wherein R is hydrogen, chloro, phenyl or substituted phenyl, $R_1$ is hydrogen or lower alkyl, $R_2$ is lower alkyl, $R_3$ is fluoro, chloro, phenoxy or substituted phenoxy and Y is an amino acid residue.

The amino protected amino acids thus obtained are employed in the synthesis of peptides, for example, the peptide fragments useful in the synthesis of the hypoglycemic agents, glucagon, as well as any other desired peptide fragment as for example pentagastrin.

The novel amino protecting group described herein is a particularly valuable protecting group in that it is readily removed from the peptide reaction product following the coupling of the protected amino acid. The protectiing group is easily removed by catalytic hydrogenolysis at neutral pH under mild conditions of temperature and pressure.

A particularly desirable feature of the novel acetylenic amino blocking group is that it can be removed via catalytic hydrogenolysis in the presence of sulfur containing groups. For example, N-protected methionine can be reacted with another amino acid or with an amino peptide to form the desired peptide containing the N-terminal acetylenic block, which can then be removed via catalytic hydrogenolysis. Likewise, N-blocked, S-blocked cysteine derivatives can be employed in peptide synthesis and the N-terminal acetylenic blocking group can be removed thereafter by catalytic hydrogenolysis.

Accordingly, this invention also provides an improved method for the synthesis of peptides in which the alkynylcarbinyloxycarbonyl group is employed as an amino protecting group.

DETAILED DESCRIPTION

The novel protected amino acids provided by this invention, wherein the amino protecting group is the alkynylcarbinyloxycarbonyl group, are represented by the following general Formula I.

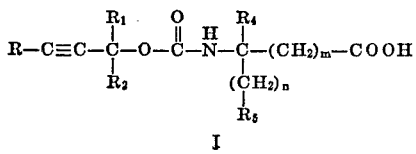

I wherein

R is hydrogen, chloro, phenyl or phenyl substituted by $C_1$–$C_4$ alkyl, $C_1$–$C_4$ alkoxy or halogen;

$R_1$ taken separately is hydrogen or $C_1$–$C_4$ alkyl;

$R_2$ taken separately is $C_1$–$C_4$ alkyl; and $R_1$ and $R_2$ when taken together with the carbon atom to which they are attached form a 5, 6 or 7 membered carbocyclic ring;

$R_4$ is hydrogen or lower alkyl;

$R_5$ is hydrogen, lower alkyl, hydroxy-substituted lower alkyl, protected hydroxy-substituted lower alkyl, amino-substituted lower alkyl, "protected amino-substituted lower alkyl," mercapto-substituted lower alkyl, protected mercapto-substituted lower alkyl, lower alkylmercapto-substituted lower alkyl, carboxy-substituted lower alkyl, protected carboxy-substituted lower alkyl, guanidino-substituted lower alkyl, protected guanidino-substituted lower alkyl, guanidinooxy-substituted lower alkyl, imidazolylmethyl, protected imidazolylmethyl, indolylmethyl, phenyl, 4-hydroxyphenyl or protected 4-hydroxyphenyl.

$m$ and $n$ are 0 or an integer from 1 to 4; and the esters thereof formed with N-hydroxysuccinimide, phenol, 2,4,5-trichlorophenol, pentachlorophenol, pentafluorophenol, and the alkali metal, alkaline earth metal, diethylamine, dicyclohexylamine and dibenzylamine salts thereof.

As used herein, the term "$C_1$–$C_4$" alkyl refers to methyl, ethyl, n-propyl, iso-propyl, n-butyl, sec-butyl, isobutyl and tert-butyl. The term "$C_1$–$C_4$ alkoxy" refers to methoxy, ethoxy, n-propoxy, iso-propoxy, n-butoxy and like lower alkyl ethers. "Halogen" refers to fluoro, chloro, bromo and iodo.

"Hydroxy-substituted lower alkyl" can include hydroxymethyl, α-hydroxyethyl, β-hydroxyethyl, γ-hydroxypropyl, 2-hydroxy-2-propyl, 2-hydroxy-2-butyl, 2-hydroxy-3-butyl, hydroxy-tert.-butyl, and the like.

"Protected hydroxy-substituted lower alkyl" refers to the foregoing hydroxy lower alkyl groups wherein the hydroxy function is protected from reaction by such groups as benzyl, substituted benzyl for example, p-methoxybenzyl, lower alkanoyl groups such as acetyl and propionyl, and lower alkyl groups such as the $C_1$–$C_4$ lower alkyl groups for example, methyl and tert-butyl.

"Amino-substituted lower alkyl" refers to 2-aminoethyl, 3-aminopropyl, 2-aminopropyl, 2-aminobutyl, and like $C_1$–$C_4$ lower alkyl groups substituted by amino, and "protected amino-substituted lower alkyl refers to the foregoing amino lower alkyl groups wherein the amino function is protected by substitution with such groups as t-butylovycarbonyl, t-amyloxycarbonyl and adamantyloxycarbonyl.

"Mercapto-substituted lower alkyl" refers to $C_1$–$C_4$ alkylmercapto for example, mercaptomethyl, 2-mercaptoethyl, 3-mercaptopropyl and the like.

"Lower-alkylmercapto-substituted lower alkyl" refers to $C_1$–$C_4$ alkylmercapto substituted lower alkyl for example, methylmercaptoethyl, isopropylmercaptomethyl, n-propylmercaptoethyl, methylmercaptobutyl, 2 - methylmercapto-2-propyl, 3 - methylmercapto-2-butyl, 2-methylmercaptomethyl-2-propyl, and the like.

"Protected mercapto-substituted lower alkyl" refers to mercapto lower alkyl groups wherein the mercapto groups are protected or blocked by such groups as tetrahydropyranyl, p-methoxybenzyl, isobutyloxymethyl, β,β-diethoxycarbonylethyl, benzyloxycarbonyl, tert-butyl, lower alkylcarbamoyl such as ethylcarbamoyl and acetamidomethyl.

"Carboxy-substituted lower alkyl" can include carboxymethyl, carboxyethyl, 2-carboxy-2-propyl, 2-carboxymethyl-2-propyl, and the like.

"Protected carboxy-substituted lower alkyl" refers to the benzyl and tert-butyl esters of the carboxyl-substituted $C_1$–$C_4$ lower alkyl groups as defined above.

"Guanidino-substituted lower alkyl" can include guanidinomethyl, guanidinoethyl, 2-guanidino-2-propyl, α,α-dimethylguanidinoethyl, and the like.

"Protected guanidino-substituted lower alkyl" refers to guanidino-substituted $C_1$–$C_4$ lower alkyl groups wherein the guanidino function as for example in the amino acid arginine is protected by such groups as carbobenzoxy, t-butyloxycarbonyl, t-amyloxycarbonyl, adamantyloxycarbonyl and nitro.

"Guanidinooxy-substituted lower alkyl" refers to the above guanidino-substituted $C_1$–$C_4$ lower alkyl substituent wherein the heterocyclic guanidine group is attached to the lower alkyl group through an additional oxygen atom.

"Protected imidazolylmethyl" refers to $N^{imid}$ amino group protected via substitution with such groups as benzyl, adamantyloxycarbonyl, and t-butyloxycarbonyl.

The alkynylcarbinyloxycarbonyl protected amino acids of the Formula I are prepared by the reaction of an active ester of an acetylenic carbinol with the desired amino acid. The chloro and fluoroformate esters and the phenyl and substituted phenyl carbonate esters of certain secondary and tertiary acetylenic carbinols are particularly useful acetylenic active esters for preparing the compounds of the Formula I. The acetylenic carbinol haloformate and phenyl carbonate esters employed in the present invention are represented by the following Formula II.

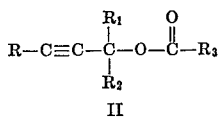

$$R-C\equiv C-\underset{\underset{R_2}{|}}{\overset{\overset{R_1}{|}}{C}}-O-\overset{\overset{O}{\|}}{C}-R_3$$

II wherein R, $R_1$ and $R_2$ have the same meanings as defined in the Formula I and $R_3$ is fluoro, chloro, phenoxy, p-nitrophenoxy, 2,4,5-trichlorophenoxy, pentachlorophenoxy and pentafluorophenoxy.

The actylenic carbinol active esters of the Formula II are prepared from readily available tertiary and secondary acetylenic carbinols by well known synthetic methods. For example, 3-methyl-1-butyn-3-ol is reacted with difluorocarbonyl or with phosgene in the presence of a hydrogen halide acceptor such as trimethylamine to provide the acetylenic carbinol chloro or fluoroformate ester such that $R_3$ in Formula II is chloro or fluoro. The acetylenic carbinol carbonate esters represented by the Formula II, wherein $R_3$ is phenoxy or substituted phenoxy, are prepared by the reaction of an acetylenic carbinol with a haloformate ester of a phenol or substituted phenol in the presence of a hydrogen halide acceptor. Preferably phenol chloroformate esters are employed in the synthesis of the acetylenic carbinol carbonate esters.

The following compounds are illustrative of the haloformate and carbonate active esters represented by the Formula II.

3-methyl-1-butyn-3-yl chloroformate
3-methyl-1-pentyn-3-yl chloroformate
3-ethyl-1-pentyn-3-yl chlorformate
3-methyl-1-butyn-3-yl fluoroformate
1-phenyl-3-methyl-1-butyn-3-yl chloroformate
1phenyl-3-methyl-1-pentyn-3-yl fluoroformate
1-p-tolyl-3-methyl-1-butyn-3-yl chloroformate
1-p-chlorophenyl-3-methyl-1-pentyn-3-yl chloroformate
1-ethynylcyclohex-1-yl chloroformate
1-ethynylcyclopent-1-yl chloroformate
1-phenylethynylcyclohex-1-yl chloroformate
3-methyl-1-hexyn-3-yl fluoroformate
3-n-propyl-1-hexyn-3-yl chloroformate
3-ethyl-1-heptyn-3-yl chloroformate
3-mehtyl-1-butyn-3-yl phenylcarbonate
3-methyl-1-butyn-3-yl 2,4,5-trichlorophenyl carbonate
3-methyl-1-butyn-3-yl pentachlorophenyl carbonate
3-methyl-1-butyn-3-yl pentafluorophenyl carbonate
3-ethyl-1-pentyn-3-yl 2,4,5-trichlorophenyl carbonate
1-phenyl-3-methyl-1-butyn-3-yl phenyl carbonate
1-phenyl-3-methyl-1-pentyn-3-yl 2,4,5-trichlorophenylcarbonate
1-ethynylcyclohex-1-yl phenyl carbonate
1-ethynylcyclohex-1-yl 2,4,5-trichlorophenyl carbonate
1-ethylnylcyclopent-1-yl 2,4,5-trichlorophenyl carbonate
1-ethynylcyclohept-1-yl phenyl carbonate
1-phenylethynylcyclohex-1-yl 2,4,5-trichlorophenyl carbonate
3-methyl-1-pentyn-3-yl pentafluorophenyl carbonate
3-ethyl-1-heptyn-3-yl 2,4,5-trichlorophenylcarbonate
1-chloro-3-methyl-1-butyn-3-yl chloroformate
1-chloro-3-methyl-1-pentyn-3-yl chloroformate
1-chloroethynylcyclohexyl-1-yl chloroformate
1-chloro-3-ethyl-1-pentyn-3-yl fluoroformate
1-butyn-3-yl chloroformate
1-butyn-3-yl phenyl carbonate
1-pentyn-3-yl chloroformate
1-butyn-3-yl 2,4,5-trichlorophenyl carbonate and like esters.

When employed herein, the term "haloformate" has reference to chloroformate and fluoroformate.

As previously mentioned, the compounds of Formula I are prepared by the reaction of an amino acid with an acetylenic carbinol haloformate or an acetylenic carbinol phenylcarbonate of the Formula II.

The preparation of the amino protected amino acid is carried out in the following manner. When the haloformate ester of the Formula II, for example a chloroformate ester, is employed in the preparation of a compound of the Formula I, the ester is added to an aqueous solution of the sodium salt of the desired amino acid at a temperature between about 0 and 15° C. The reaction mixture is allowed to stir for about 12 hours, during which time the temperature is allowed to reach room temperature. The aqueous reaction product mixture is washed with ether and then acidified to about pH 1 with concentrated hydrochloric acid. The product precipitates from the acidified aqueous mixture either as a solid or as an oil.

The alkynylcarbinyloxycarbonyl protected amino acid reaction product, when thus obtained as a solid precipitate is filtered and can be further purified by crystallization from a suitable solvent.

The N-protected amino acid when obtained as an oil or semi-solid precipitate can be isolated and purified in the form of a crystalline amine salt in the following manner. The precipitated oil is extracted from the aqueous acidic reaction mixture with a suitable solvent, for example ethyl acetate, and the extract is washed with water and dried. The dried extract is evaporated to dryness and the oily reaction product residue is taken up in ether. Upon the addition of a basic organic amine to the ethereal solution the crystalline amine salt of the alkynylcarbinyloxycarbonyl protected amino acid is obtained. Suitable amine salts can be prepared with organic amines such as triethyl amine, dibenzylamine, dicyclohexylamine, 1,4-diazabicyclo[2.2.2] octane, and the like. A preferred amine is dicyclohexylamine. The amine salts of N-protected amino acids can be further purified by recrystallization from a suitable solvent or mixture of solvents. For example, the dicyclohexylamine salts are desirably recrystallized from a mixture of ether and pentane.

The compounds of the Formula I can likewise be prepared by the reaction of an acetylenic carbinol carbonate active ester represented by the Formula II, wherein $R_3$ is phenoxy or substituted phenoxy.

When a phenylcarbonate ester of the Formula II is reacted with an amino acid, the reaction is carried out in the following manner. The amino acid and the acetylenic carbinol carbonate ester are dissolved in a solvent mixture consisting of water and a co-solvent such as an alcoholic solvent, for example iso-propanol, tertiary butanol, isoamyl alcohol or other suitable alcoholic solvent. A hydrogen halide acceptor such as a tertiary amine, for example triethylamine, is added and the reaction mixture is stirred for about 2 hours to about 8 hours at a temperature maintained between about 45 and 75° C.

The amino-protected amino acid reaction product in isolated by evaporating the reaction product mixture in vacuo and dissolving the oily residue in water. The solution is acidified to about pH 3 with an organic acid, for example acetic acid or citric acid, and the oily precipitate is extracted with ethyl acetate. The extract is washed and dried and is then evaporated in vacuo to provide the alkynylcarbinyloxycarbonyl amino-protected amino acid either as an oily residue or as a solid residue. The reaction product thus obtained can be further purified as the N-protected amino acid in the free acid form or as an amine salt thereof in the manner described in the above described preparation from the haloformate esters.

The preparation of illustrative N-protected amino acids and the amine salts thereof is further described in more specific detail in the examples contained hereinafter.

The protected amino acids thus obtained are useful in the synthesis of peptides. The free carboxyl group of the amino-protected amino acid can be reacted with another amino acid or peptide containing a free amino group to provide the amide linkage of a di- or higher peptide. This reaction is commonly carried out by first preparing an active ester of the condensing amino acid. One such ester which can be employed is the 2,4,5-trichlorophenyl ester of the N-protected amino acid.

Alternatively, the active ester of an unprotected amino acid can first be prepared, and the amino group thereof can then be protected by the alkynylcarbinyloxycarbonyl protecting group. Active esters of the amino acids which are commonly employed in the synthesis of peptides can be used in the present invention. For example, the esters prepared with N-hydroxysuccinimide, substituted phenyl esters and especially the 2,4,5-trichlorophenyl and pentachlorophenyl esters can be employed.

In one of its aspects, the present invention provides a convenient method for preparing a phenyl or substituted phenyl active ester of an alkynylcarbinyloxycarbonyl protected amino acid. According to this aspect of the invention, when an acetylenic carbinol carbonate ester of the Formula II ($R_3$ being phenoxy or substituted phenoxy) is employed in the preparation of an alkynylcarbinyloxycarbonyl protected amino acid, the side product of the reaction is phenol or a substituted phenol. The phenolic side product present in the reaction product mixture along with the alkynylcarbinyloxycarbonyl protected amino acid can then be reacted with the free carboxylic acid function of the N-protected amino acid by adding to the reaction product mixture a suitable condensing reagent such as dicyclohexylcarbodiimide to provide the alkynylcarbinyloxycarbonyl amino protected amino acid phenyl or substituted phenyl active ester. The alkynylcarbinyloxycarbonyl protected amino acid ester is then isolated and purified for subsequent use in the synthesis of peptides.

For example, an acetylenic carbinol carbonate ester of Formula II is reacted with the desired amino acid as previously described to produce a reaction product mixture comprising the alkynylcarbinyloxycarbonyl amino-protected amino acid and a phenol or substituted phenol. The mixture is evaporated to a residue which is then treated with water and acidified to a pH of about pH 3 with a weak acid such as citric acid. The acidified solution is extracted with a suitable organic solvent, such as ethyl acetate, and the extract is washed and dried. The extract is evaporated to yield an oily mixture comprising the N-protected amino acid and the phenol or substituted phenol. A small volume of ethyl acetate is added to the residue and the solution thus obtained is cooled to a temperature of about 0 to 5° C. To the cold solution is added a condensing agent, such as dicyclohexylcarbodiimide, and the reaction mixture is allowed to stir overnight while warming to room temperature. The precipitated urea side product formed in the reaction is filtered and the filtrate is evaporated to yield the carbonate ester of the N-protected amino acid as a crude residue. The residue can be purified and the reaction product obtained crystalline by crystallization from a suitable solvent. Preferred solvents for the crystallization of these ester reaction products are mixtures of ethylacetate and pentane.

The above described methods for the preparation of the compounds of the invention are illustrated by the following general Reaction Scheme I.

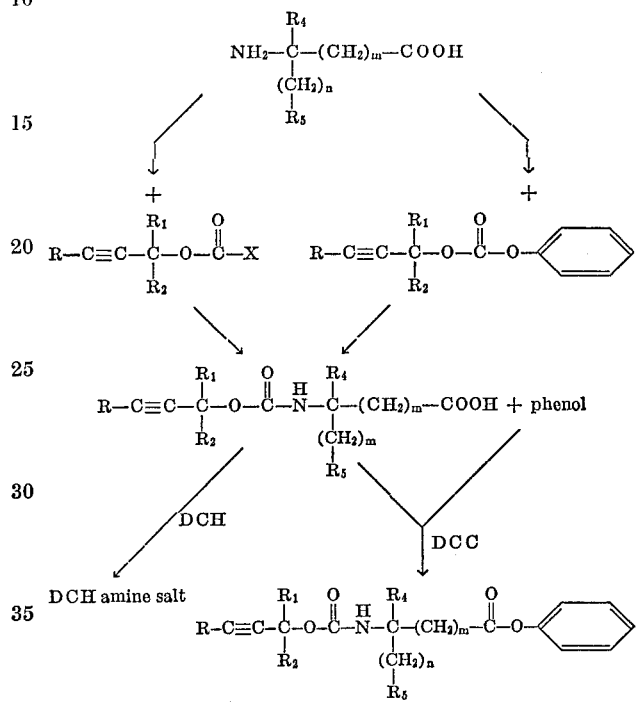

X is chloro or fluoro
DCC is dicyclohexylcarbodiimide
DCH is dicyclohexylamine

Any of the known amino acids can be protected by the novel amino protecting group of this invention. For example, the monocarboxylic α-amino acids such as glycine, alanine, valine, leucine, isovaline, phenylalanine, tyrosine, serine, cysteine, methionine; the mono amino dicarboxylic acids such as arginine, lysine and ornithine; glutamine and asparagine; and the heterocyclic substituted amino acids such as histidine, tryptophane, and proline. Likewise the β-amino acids such as α-phenyl-β-amino propionic acid, β-phenyl β-aminopropionic acid, β-aminopropionic acid, β-aminobutyric acid, β-amino caproic acid, omega-hydroxy-β-aminovaleric acid, epsilon-hydroxy - β - aminocaproic acid, β-aminoisovaleric acid, β-amino-gamma-guanidinovaleric acid, β-aminoglutaric acid, β-amino-gamma-ethylmercaptobutyric acid, and β-amino-gamma-methylmercaptobutyric acid.

The following are examples of the alkynylcarbinyloxycarbonyl protected amino acids and esters provided by this invention.

N-(3-methyl-1-butyn-3-oxycarbonyl)-L-glycine,
N-(3-methyl-1-butyn-3-oxycarbonyl)-L-alanine,
N-(3-methyl-1-pentyn-3-oxycarbonyl)-L-valine,
N-(3-methyl-1-butyn-3-oxycarbonyl)-D-phenylglycine,
N-(3-methyl-1-butyn-3-oxycarbonyl)-L-methionine,
N-(1-chloro-3-methyl-1-butyn-3-oxycarbonyl)-L-methionine,
N-(1-phenyl-3-methyl-1-butyn-3-oxycarbonyl)-L-aspartic acid,
N-(3-methyl-1-butyn-3-oxycarbonyl)-L-cysteine,
N-(1-ethynylcyclohexyl-1-oxycarbonyl)-L-methionine,
N-(3-methyl-1-butyn-3-oxycarbonyl)phenylalanine,
N-(3-methyl-1-butyn-3-oxycarboxyl)-L-tryptophane N-(3-methyl-1-butyn-3-oxycarbonyl)-S-trityl-L-cysteine,
N-(3-methyl-1-pentyn-3-oxycarbonyl)-S-benzyl-L-cysteine,
N-(1-ethynylcyclopentyl-1-oxycarbonyl)-S-benzhydryl-L-cysteine,
N-(3-methyl-1-butyn-3-oxycarbonyl)-O-t-butyl-L-serine,
N-(1-phenyl-3-methyl-1-pentyn-3-oxycarbonyl)-O-benzyl-L-serine,
N-(3-methyl-1-butyn-3-oxycarbonyl)tyrosine,
α-N-(3-methyl-1-butyn-3-oxycarbonyl)-L-ornithine,
α-N-(3-methyl-1-pentyn-3-oxycarbonyl)-E-t-butyloxycarbonylamino-L-lysine,
α-N-(3-methyl-1-butyn-3-oxycarbonyl)histidine,
N-(3-ethyl-1-pentyn-3-oxycarbonyl)glutamic acid
N-(3-methyl-1-hexyn-3-oxycarbonyl)isovaline,
N-(1-ethynylcycloheptyl-1-oxycarbonyl)alanine,
N-(3-methyl-1-butyn-3-oxycarbonyl)methionine and the alkali metal, alkaline earth metal and amine salts thereof such as the lithium, sodium potassium, calcium, diethyl amine, dicyclohexylamine, triethylene diamine and dibenzylamine salts, and the active esters thereof such as the p-nitrobenzyl, pentachlorophenyl, pentafluorophenyl, 2,4,5-trichlorophenyl esters and the esters formed with N-hydroxysuccinimide.

As previously discussed, the alkynylcarbinyloxy carbonyl protected amine acids can be in many instances isolated and purified in the form of their amine salts. A preferred amine for the preparation of amine salts of the N-protected amino acids is dicyclohexylamine. Table I, which follows, lists illustrative dicyclohexylamine salts of N-protected amino acids provided by this invention.

TABLE II

Active esters of N-(3-methyl-1-butyn-3-oxycarbonyl)-protected amino acid $$H-C\equiv C-\underset{\underset{CH_3}{|}}{\overset{\overset{CH_3}{|}}{C}}-O-\overset{\overset{O}{\|}}{C}-\overset{\overset{H}{|}}{N}-\underset{\underset{R}{|}}{CH}-\overset{\overset{O}{\|}}{C}-O-R''$$

| Amino acid starting material | R' | R'' | M.P., °C. |
|---|---|---|---|
| L-methionine | —(CH$_2$)$_2$—S—CH$_3$ | 2,4,5-TCP [1] | 97-98 |
| S-benzhydryl-L-cysteine | —CH$_2$—S—CH(φ)$_2$ | 2,4,5-TCP | 128-131 |
| S-Benzyl-L-cysteine | —CH$_2$—S—CH$_2$φ | 2,4,5-TCP | 59-62 |
| D-α-phenylglycine | C$_6$H$_5$— | 2,4,5-TCP | 69-71 |
| L-tryptophane | indolyl-CH$_2$— | 2,4,5-TCP | 123-125 |
| L-phenylalanine | —CH$_2$C$_6$H$_5$ | N-hydroxysuccinimide | 128-130 |

[1] 2,4,5-TCP = 2,4,5-trichlorophenyl.

As previously emntioned, the N-protected amino acids provided by this invention are useful in the synthesis of peptides. Accordingly, this invention provides an improved method for the synthesis of peptides. The N-protected amino acids of the Formula I can be reacted with another

TABLE I

Dicyclohexylamine (DCHA) salts of alkynylcarbinyloxycarbonyl protected amino acids $$R-C\equiv C-\underset{\underset{R_2}{|}}{\overset{\overset{R_1}{|}}{C}}-O-\overset{\overset{O}{\|}}{C}-\overset{\overset{H}{|}}{N}-\underset{\underset{R'}{|}}{CH}-\overset{\overset{O}{\|}}{C}-O^-\ D^+CHA$$

| Amino acid starting material | R | R$_1$ | R$_2$ | R' | M.P., °C. |
|---|---|---|---|---|---|
| L-methionine | H | CH$_3$ | CH$_3$ | —(CH$_2$)$_2$SCH$_3$ | 117-119 |
| L-phenylalanine | H | CH$_3$ | CH$_3$ | —CH$_2$—C$_6$H$_5$ | 205-206 |
| L-methionine | H | —(CH$_2$)$_5$— | | —(CH$_2$)$_2$—SCH$_3$ | 119-121 |
| Do | Cl | CH$_3$ | CH$_3$ | —(CH$_2$)$_2$—SCH$_3$ | 115-117 |
| Do | C$_6$H$_5$ | CH$_3$ | CH$_3$ | —(CH$_2$)$_2$—SCH$_3$ | 132-133.5 |
| S-trityl-L-cysteine | H | CH$_3$ | CH$_3$ | —CH$_2$—S—C(φ)$_3$ | 177.5-179 |
| O-t-butyl-L-serine | H | CH$_3$ | CH$_3$ | —CH$_2$—O—C(CH$_3$)$_3$ | 146-148 |
| L-valine | H | CH$_3$ | CH$_3$ | —CH(CH$_3$)$_2$ | 126-128 |
| L-glutamine | H | CH$_3$ | CH$_3$ | —CH$_2$—CH$_2$—C(=O)—NH$_2$ | 152-154 |
| L-tryptophane | H | CH$_3$ | CH$_3$ | indolyl-CH$_2$— | 178.5-180 |
| D-α-phenylglycine | H | CH$_3$ | CH$_3$ | C$_6$H$_5$— | 138-140 |
| O-t-butyl-L-threonine | H | CH$_3$ | CH$_3$ | —CH(CH$_3$)—O—C(CH$_3$)$_3$ | 160-162 |
| O-t-butyl-L-tyrosine | H | CH$_3$ | CH$_3$ | —CH$_2$—C$_6$H$_4$—O—C(CH$_3$)$_3$ | 125-128 |

The following Table II lists illustrative active esters of alkynylcarbinyloxycarbonyl protected amino acids wherein two preferred ester groups, namely the 2,4,5-trichlorophenyl esters and the ester derived from N-hydroxysuccinimide, are exemplified.

amino acid to provide a dipeptide, or alternatively, the N-protected amino acid can be reacted with a previously elaborated peptide to provide a peptide containing the additional amino acid provided by the N-blocked amino acid. The coupling of the N-protected amino acid with another amino acid or peptide containing a free amino group is carried out by methods well known and practiced in the art of synthetic peptide chemistry. For example, the N-protected amino acids of Formula II can be coupled with the amino group of another amino acid or amino peptide by reacting the carboxylic acid portion of the N-protected amino acid as an active ester, a mixed anhydried, an acid halide or by the use of dicyclohexylcarbodiimide, and like peptide coupling methods which are commonly employed by those skilled in the art.

Following synthesis of the desired dipeptide or polypeptide the alkynylcarbinyloxycarbonyl amino-protecting group is readily removed by catalytic hydrogenolysis. The acetylenic amino protecting group of the present invention is a particularly valuable amino-blocking group in peptide synthesis because of its facile removal at neutral pH via catalytic hydrogenolysis under mild conditions of temperature and pressure. The amino-protecting group of this invention is an especially desirable amino blocking group in that it is readily removed in the presence of sulfur containing functional groups which may be present in the same peptide molecule.

Because of the facile cleavage at neutral pH of the amino-protecting groups of this invention, other blocking groups within the same peptide molecule which are removed by either acidic or basic hydrolysis remain substantially intact while the alkynylcarbinyloxycarbonyl group is selectively removed.

The catalytic hydrogenolysis of the amino-protecting groups described herein is carried out in an inert solvent at a temperature between about 15 and 45° C. under a hydrogen pressure of between about one atmosphere to about five atmospheres in the presence of a hydrogenation catalyst. A preferred catalyst is palladium supported on carbon, for example, 5 or 10 percent palladium on carbon. Other hydrogeneration catalyst such as platinum, platinum oxide, rhodium and ruthenium can be employed as supported catalysts supported on the commonly used catalyst supports such as carbon, alumina, silica gel and the like. Likewise, these catalysts including palladium can be used in their finely divided metallic state without a support.

Solvents such as the alcohols, ethers and esters, for example, methanol, ethanol, isopropanol, tetrahydrofuran, dioxane, ethyl acetate, amyl acetate and like solvents can be used in the hydrogenolysis. Solvents such as dimethylformamide, dimethylsulfoxide, aqueous acetic acid and other commonly employed solvents can likewise be employed.

The reaction is preferably carried out at room temperature at a hydrogen pressure of between about 15 and 45 p.s.i. in the presence of between about 0.05 to 0.75 gram of 5 percent palladium on carbon per millimole of peptide. Preferably, 0.5 g. of 5 percent palladium on carbon per millimole of peptide is employed.

The hydrogenolysis can be carried out in a Parr hydrogenation apparatus or in a suitable glass vessel such as an open beaker or round-bottomed flask or other reaction vessel. When the hydrogenolysis is carried out in a flask or open beaker the catalyst is suspended in a solution containing the peptide and hydrogen gas is bubbled through the solution with stirring. Carbon dioxide is evolved from the reaction solution as the hydrogenolysis proceeds and can be trapped in a solution of barium hydroxide to determine when the hydrogenolysis reaction is complete.

When in the Formula II, R represents chloro, the hydrogenolysis of the alkynylcarbinyloxycarbonyl group is accompanied by the hydrogenolysis of the chloro substituent with the formation of hydrogen chloride. The hydrogen chloride thus generated is available for the preparation, in situ, of the hydrochloride salt of the free amino group resulting from the removal of the protecting group.

The chloroacetylenic protecting group, for example the 1-chloro-3-methyl-1-butyn-3-oxycarbonyl group, is particularly useful in the synthesis of N-terminal glutamine peptides. Glutamine peptide residues readily undergo intramolecular cyclization to form the undesirable pyroglutaminyl residue within the peptide.

When a chloroacetylenic blocking group of this invention is employed the generation of hydrogen chloride concurrently with the hydrogenolysis of the blocking group results in the glutamine residue of the peptide and prevents the cyclization of the glutamine residue.

The alkynylcarbinyloxycarbonyl protecting group is an especially useful amino protecting group in peptide synthesis in that it can be selectively hydrogenolyzed from peptides in the presence of the commonly employed carboxylic acid, amino, hydroxyl and thiol group protecting groups which can be present in the same peptide. For example, the alkynylcarbinyloxycarbonyl group can be removed via the above described hydrogenolysis procedure in the presence of such amino protecting groups as the tert-butyloxycarbonyl (t-BOC) and adamantyloxycarbonyl groups, as for example the t-BOC protected $\epsilon$-amino group of lysine and the t-BOC-$\delta$-amino group of ornithine.

The acetylenic amino-protecting group can be selectively removed from peptides containing sulfur groups along with protecting groups amenable to hydrogenolysis, for example, the benzyl esters and benzyl ethers.

Likewise, the alkynylcarbinyloxycarbonyl amino protecting group is removable via catalytic hydrogenolysis under neutral pH conditions in the presence of a protected sulfhydryl group as for example S-protected cysteine. Such S-protecting groups include for example, the tetrahydropyranyl group, the p-methoxybenzyl group [Bull. Chem. Soc., Japan, 37, (3) 433 (1964)], the isobutyloxymethyl group [J. Org. Chem., 35, 215 (1970); J. Chem. Soc., 3832 (1964)], the $\beta,\beta$-diethoxycarbonylethyl group, the S-ethylmercapto group [Bull. Chem. Soc. Japan, 40, 2913 (1969)], the alkoxycarbonyl and benzyloxy carbonyl group [J. Am. Chem. Soc., 85, 1337 (1963)], the alkylcarbamoyl group [Helv. Chim. Acta, 49, (14) 83 (1966)] the acetamidomethyl group [Tetrahedron Letters, No. 26, 3057 (1968)] the tert-butyl group and like thiol protecting groups which are commonly employed in the peptide synthesis art.

The alkynylcarbinyloxycarbonyl amino protecting group is an especially valuable tool in the synthesis of peptides since it is removable from the amino group of peptides containing a sulfur group, as for example, methionine, cysteine and peptides comprising these amino acids.

This invention, accordingly, provides a novel group of alkynylcarbinyloxycarbonyl protected peptides which can also contain other reactive groups protected with the commonly employed blocking groups. The alkynylcarbinyloxycarbonyl protected peptides provided by this invention are represented by the following general Formula III.

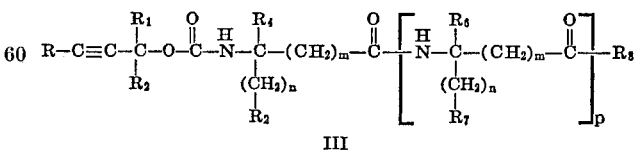

III wherein

R is hydrogen, chloro, phenyl or phenyl substituted by $C_1$–$C_4$ alkyl, $C_1$–$C_4$ alkoxy or halogen;

$R_1$ taken separately is hydrogen or $C_1$–$C_4$ alkyl;

$R_2$ taken separately is $C_1$–$C_4$ alkyl; and $R_1$ and $R_2$ when taken together with the carbon atom to which they are attached form a 5, 6 or 7 membered carboxylic ring;

$R_4$ and $R_6$ independently are hydrogen or lower alkyl;

$R_5$ and $R_7$ independently are hydrogen, lower alkyl, hydroxy-substituted lower alkyl, protected hydroxy-substituted lower alkyl, amino-substituted lower alkyl, protected amino-substituted lower alkyl, mercapto-substituted lower alkyl, lower alkylmercapto-substituted lower alkyl, carboxy-substituted lower alkyl, protected carboxy-substituted lower alkyl, guanidino-substituted lower alkyl, protected guanidino substituted lower alkyl, guanidinooxy-substituted lower alkyl, imidazolylmethyl, protected imidazolylmethyl, indolylmethyl, protected indolylmethyl, phenyl, 4-hydroxyphenyl or protected 4-hydroxyphenyl;

$R_8$ is hydroxy, methoxy, ethoxy, t-butoxy, 2,2,2-trichloroethoxy, benzyloxy, 4-nitrobenzyloxy, 2,4,5-trichlorophenoxy, pentachloroethoxy, pentafluorophenoxy, or amino;

$m$ and $n$ independently are 0 or an integer from 1 to 4;

$p$ is 0 or an integer from 1 to 14;

provided that when $p$ is greater than 1, then the meaning of $R_6$, $R_7$, $m$ and $n$ as between the individual amino acid residues comprising the chain can be the same or different.

It will be noted that in the above Formula III the portion represented within brackets comprises an amino acid residue. It will be understood that the values of $R_6$, $R_7$, $m$ and $n$ as between the individual amino acid residues can be the same or different.

When in the above Formula III, $R_5$ is representative of a protected substituent for example a protected mercapto-substituted lower alkyl substituent, such protected functions have the same meanings as previously defined in Formula I.

The peptides of the Formula III which are prepared with the natural amino acids are a preferred group of peptides useful in a wide variety of ways well recognized in the art of peptide chemistry. Such peptides containing natural amino acid residues can be employed in the synthesis of known polypeptides, for example glucagon, having known physiological properties. The compounds of Formula III prepared with amino acids which do not occur naturally can be used in the synthesis of soluble polymers of varying molecular weight which can be employed as coating surfaces.

In another of its aspects, this invention relates to a method for preparing peptides wherein the alkynylcarbinyloxycarbonyl group is employed as an amino-protecting group.

According to the practice of this invention, the amino group of an amino acid is protected by reacting the amino acid with an acetylenic haloformate or acetylenic carbonate represented by the Formula II to provide the N-protected amino acid of the Formula I. The carboxylic acid function of the N-protected amino acid is then converted to an active ester, a mixed anhydride or an acyl halide. Alternatively, the carboxylic acid function of the amino acid can be first converted to an active ester, a mixed anhydride or an acyl halide and the amino group protected thereafter by the reaction with an acetylenic haloformate or carbonate ester of the Formula II. The conversion of the carboxylic acid function to such derivatives is carried out by commonly employed methods well known to those skilled in the art. In many instances the N-protected amino-acid provided by this invention can be coupled to form a peptide without derivatizing the carboxylic acid function, by carrying out the coupling reaction by means of a condensing reagent such as dicyclohexylcarbodiimide.

The N-protected amino acid, active ester, mixed anhydride, or acyl halide thus obtained is then reacted with another amino acid or amino peptide to provide the desired peptide represented by the Formula III wherein the terminal amino group is protected by an alkynlcarbinyloxycarbonyl group. Other reactive groups which may be present in the amino acid or amino peptide are desirably protected by such protecting groups as are commonly employed in peptide synthesis.

The N-terminal alkynylcarbinyloxycarbonyl protecting group of the di- or polypeptide thus obtained is then selectively removed by catalytic hydrogenolysis over 5 percent palladium on carbon according to the de-blocking reaction previously discussed.

The amino peptide thus prepared can be isolated and purified by commonly employed techniques as for example by extraction, recrystallization or adsorption techniques such as column chromatography or preparative thin layer chromatography.

The dipeptide or polypeptide containing a free N-terminal amino group thus isolated can then be reacted with another amino acid protected by the alkynylcarbinyloxycarbonyl protecting group of this invention to obtain a tripeptide or a polypeptide now containing the latter amino acid in the peptide chain. The N-terminal protecting group is then removed via the catalytic hydrogenolysis procedure previously described to provide the free N-terminal amino tripeptide or polypeptide.

Accordingly, the present method, which comprises the consecutive steps of coupling an N-protected amino acid of the Formula I with another amino acid or amino peptide followed by catalytic hydrogenolysis of the acetylenic protecting group from the coupling product can be employed for the synthesis of peptides of any desired chain length and desired amino acid composition.

The peptide synthesis method described herein is a particularly useful method because of the desirable features and advantages of the alkynylcarbinyloxycarbonyl amino protecting group. As previously discussed, this protecting group is easily removed by catalytic hydrogenolysis at neutral pH. Consequently, other acid or base labile protecting groups of the elaborated peptide remain intact as the acetylenic protecting group is removed. Likewise, the N-protecting group of this invention is readily removed in the presence of sulfur containing functional groups.

In many instances the alkynylcarbinyloxycarbonyl protecting group because of its lability to catalytic hydrogenolysis can be selectively removed in the presence of other protecting groups which are themselves capable of removal by catalytic hydrogenolysis. Two such commonly employed protecting groups are the benzyl and the benzyloxycarbonyl groups (carbobenzoxy). For example, when N-carbobenzoxy-L-methionylglycine ethyl ester was subjected to hydrogenolysis conditions (1.1 g. of compound in 25 ml. of methanol containing 3 ml. of 1 N HCl in the presence of 0.3 g. of 5 percent Pd-C) the starting material was recovered after 4 hours. Under the same conditions of hydrogenolysis, N-(3-methyl-1-butyn-3-oxycarbonyl)-L-methionylglycine ethyl ester, afforded L-methionylglycine ethyl ester in about an 80 percent yield.

The alkynylcarbinyloxycarbonyl protecting group of this invention can also be removed from the peptide product, a compound of the Formula III, by acid hydrolysis. The acidic cleavage can be carried out by reacting the N-protected peptide with trifluoroacetic acid or with a 1 N solution of hydrogen chloride in glacial acetic acid. Consequently, when the N-protected peptide of the Formula III is the desired end product of the synthetic method of this invention, other acid labile protecting groups may be removed concurrently with the acidic removal of the alkynylcarbinyloxycarbonyl group. Such commonly employed blocking groups as the t-butyloxycarbonyl group, the O-t-butyl group and t-butyl ester group can be removed along with the acidic cleavage of the alkynylcarbinyloxycarbonyl group.

When, however, the compound of the Formula III is an intermediate in the synthesis of a peptide of higher molecular weight, selective removal of the alkynylcarbinyloxycarbonyl group via catalytic hydrogenolysis can be achieved as hereinbefore discussed with such acid labile protecting groups as the t-butyl ethers and esters and t-BOC protected amino groups remaining intact for subsequent coupling reactions.

A preferred blocking group of this invention is the 3-methyl-1-butyn-3-oxycarbonyl protecting group represented by the formula

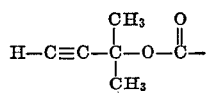

In a specific embodiment of the present invention L-aspartyl-L-phenylalanine amide, prepared as described by Morely, J. Chem. Soc. 1966, 555, is reacted with N-(3-methyl - 1 - butyn-3-oxycarbonyl)-L-methionine 2,4,5-trichlorophenyl ester in DMF at 0° C. in the presence of triethylamine to provide N-(3-methyl-1-butyn-3-oxycarbonyl)-L-methionine-L-aspartyl-L-phenylalanine amide in a 61 percent yield. The product thus obtained is dissolved in 80 percent acetic acid and the solution is hydrogenated for 2.5 hours at room temperature under one atmosphere of hydrogen in the presence of 5 percent palladium on carbon to provide in 62 percent yield the tripeptide, L-methionyl-L-aspartyl-L-phenylalanine amide.

The tripeptide is then reacted with N-(3-methyl-1-butyn - 3 - oxycarbonyl) - L - tryptophane 2,4,5-trichlorophenyl ester (of Formula I) in DMF solvent in the presence triethylamine at a temperature between about —20 and 0° C. to provide the N-protected tetrapeptide of the Formula III, N - (3 - methyl-1-butyn-3-oxycarbonyl)-L-tryptophyl - L - methionyl - L - aspartyl - L - phenylalanine amide. Catalytic hydrogenolysis of the N-blocked tetrapeptide over 5 percent palladium on carbon at room temperature affords the known tetrapeptide, Tetragastrin.

In the foregoing specific embodiment the coupling of the N-protected amino acid with the amino peptides was carried out by means of the active ester of the N-protected amino acid. Alternatively the coupling can be carried by other standard methods as for example by reacting a mixed anhydride of the N-protected amino acid with the amino peptide.

The compounds of the Formula I in the form of amine salts as for example the dicyclohexylamine salts can be coupled with other amino acids or amino peptides by carrying out the coupling reaction with the condensing reagent dicyclohexylcarbodiimide. For example, the dicyclohexylamine salt of N-(3-methyl-1-butyn-3-oxycarbonyl)-L-methionine is reacted with β-benzyl-L-aspartyl-L-phenylalanine methyl ester hydrochloride in an inert solvent such as the chlorinated hydrocarbons and preferably methylene chloride, in the presence of one-equivalent of dicyclohexylcarbodiimide to obtain the N-protected peptide of the Formula III, N-(3-methyl-1-butyn-3-oxycarbonyl) - L - methionine-β-benzyl-L-aspartyl-L-phenylalanine methyl ester. Catalytic hydrogenolysis of the blocked peptide thus prepared over 5 percent Pd/C affords the tripeptide L-methionine-(β-benzyl)-L-aspartyl-L-phenylalanine methyl ester which can be isolated as the crystalline hydrochloride salt.

The N-protected amino acids and N-protected peptides of this invention are useful for the preparation of a wide variety of peptides. For example, they can be employed in the synthesis of peptide fragments in the synthesis of the hyperglycemic agent glucagon. Likewise, the compounds and method of this invention can be employed in the synthesis of such known peptides as oxytocin, vasopressin, secretin, insulin, gastrin, proinsulin, thyrocalcitonin, corticotropin releasing factor (CFR), adrenocorticotropic hormone (ACTH), caeurulin and cholecystokinin.

The following Table III lists illustrative peptides represented by the Formula II and prepared according to the method of this invention. For reasons of brevity, the nomenclature recommended for amino acids and peptides by the IUPAC–IUB Commission on Biochemical Nomenclature is employed. The 3-methyl-1-butyn-3-oxycarbonyl protecting group, a preferred acetylenic blocking group of this invention, is illustrative of those represented by the Formulae I and II and is indicated by the designation MBOC (methylbutynyloxycarbonyl). The designation PBOC refers to the 3-methyl-1-phenyl-1-butyn-3-oxycarbonyl group and ECOC refers to the 1-ethynylcyclohexyl-1-oxycarbonyl protecting group.

TABLE III.—ALKYNYLCARBINYLOXYCARBONYL PROTECTED PEPTIDES

| No. | Peptide |
| --- | --- |
| 1 | MBOC-L-Trp-L-Leu methyl ester. [1] |
| 2 | MBOC-O-t-butyl-L-Ser-L-Arg-L-Arg-L-Ala-Gln-β-t-butyl-L-Asp.2HCl. |
| 3 | MBOC-S-benzhydryl-L-Cys-Gly ethyl ester. |
| 4 | MBOC-S-trityl-L-Cys-Gly ethyl ester. |
| 5 | MBOC-L-Phe-S-trityl-L-Cys-Gly ethyl ester. |
| 6 | MBOC-L-Trp-L-Met-L-Asp-L-Phe amide. |
| 7 | MBOC-L-Met-L-Asp-L-Phe amide. |
| 8 | MBOC-L-Met-L-Asn-di-O-t-butyl-L-Thr. |
| 9 | MBOC-L-Phe-L-Val-L-Gln-L-Trp-L-Leu-L-Met-L-Asn-di-O-t-butyl-L-Thr. |
| 10 | MBOC-L-Phe-L-Val-L-Gln-L-Trp-L-Leu. |
| 11 | PBOC-L-Met-L-Asn-di-O-t-butyl-L-Thr. [2] |
| 12 | ECOC-L-Met-L-Asn-di-O-t-butyl-L-Thr. [3] |
| 13 | MBOC-O-t-butyl-L-Ser-L-Arg-L-Arg-L-Ala-L-Gln-L-Trp-L-Leu-L-Met-L-Asn-di-O-t-butyl-L-theoninate.2HCl. |
| 14 | MBOC-O-t-butyl-L-Ser-L-Ala-L-Glu-L-Ala-L-Phe-L-Pro-L-Leu-Glu-L-Phe. |
| 15 | MBOC-S-benzyl-L-Cys-O-t-butyl-L-Ser-L-Asn-L-Leu-O-t-butyl-L-Ser-L-Thr. |
| 16 | MBOC-L-His-L-Ser-L-Asp-Gly-L-Thr-L-Phe-L-Thr-L-Ser-L-Glu-L-Leu-L-Ser-L-Arg-L-Leu-L-Arg-L-Asp. |
| 17 | MBOC-L-Lys-L-Arg-L-Pro-L-Pro-Gly-L-Phe-L-Ser-L-Pro-L-Phe-L-Arg. |
| 18 | MBOC-O-t-butyl-L-Tyr-O-t-butyl-L-Ser-E-t-BOC-L-Lys-O-t-But-L-Tyr-L-Leu-β-O-t-butyl-L-Asp acid. |

[1] MBOC=3-methyl-1-butyn-3-oxycarbonyl.
[2] PBOC=1-phenyl-3-methyl-1-butyn-3-oxycarbonyl.
[3] ECOC=1-ehtynylcyclohexyl-1-oxycarbonyl.

The alkynylcarbinyloxycarbonyl protected peptides listed in Table III undergo catalytic hydrogenolysis as previously described to provide the amino peptides in excellent yields. For example, the N-protected tetrapeptide in line 6 affords the peptide Tetragastrin in 66 percent yield.

The N-protected tripeptides on lines 11 and 12 in Table III undergo catalytic hydrogenolysis to afford the 27–29 peptide fragment of glucagon in yields greater than 60 percent. This fragment has previously been synthesized in an 84 percent yield by E. Wunsch et al., Chem. Ber. 98, 803 (1965).

Similarly, the 22–26 fragment of glucagon is obtained in excellent yield by the hydrogenolysis of the N-protected pentapeptide of line 10 as well as the 22–29 octapeptide fragment of glucagon of line 9.

In a further embodiment of the compounds and synthetic method of this invention the 22–26 glucagon peptide fragment is prepared as follows. N-(3-methyl-1-butyn-3-oxycarbonyl)-L-phenylalanyl N-hydroxy-succinimide ester is reacted with L-valyl-L-glutaminyl-L-tryptophyl-L-leucine in DMF solvent at a temperature of about —5 to 10° C. The reaction is slowly allowed to warm to room temperature and is then agitated by stirring for about 80–90 hours to provide N-(3-methyl-1-butyn-3-oxycarbonyl)-L-phenylalanyl - L - valyl-L-glutaminyl-L-triptophyl-L-leucine. The N-protected pentapeptide thus prepared is then reacted with the tripeptide fragment L-methionyl-L-asparaginyl-di- O - t-butyl-L-threoninate in a solvent such as DMF via the in situ preparation and reaction of the N-hydroxysuccinimide ester of the carboxyl group of leucine in the pentapeptide to yield the N-protected octapeptide fragment of glucagon (22–29), N-(3-methyl - 1 - butyn-3-oxycarbonyl)-L-phenylalanyl-L-valyl-L-glutaminyl - L - tryptophyl-L-leucyl-L-methionyl-L-asparaginyl-di-O-t-butyl-L-threoninate.

The tripeptide fragment of glucagon (27–29) is prepared by reacting N-(3-methyl-1-butyn-3-oxycarbonyl)-L-methionine with L-asparaginyl-di-O-t-butyl-L-threoninate in the presence of the coupling reagent N-ethoxycarbonyl-2-ethoxy-1,2-dihydroquinoline (EEDQ) in a suitable solvent such as tetrahydrofuran or DMF to provide N-(3-methyl-1-butyn - 3 - oxycarbonyl)-L-methionine-L-asparaginyl-di-O-t - butyl - L-threoninate. Catalytic hydrogenolysis of the N-protected tripeptide affords the amino tripeptide for coupling with the N-protected pentapeptide fragment as described above.

This invention is more fully illustrated by the following specific examples but is not intended to be so limited.

Thin layer chromatograms were conducted by the ascending method in the indicated solvent systems on precoated plates having a silica gel layer of 0.25 mm. thickness obtainable from Brinkman Instruments, Inc., Westbury, N.Y. 11590.

Preparation of acetylenic haloformate and phenyl carbonate active esters.

EXAMPLE 1

1-phenyl - 3 - methyl-1-butyn-3-yl phenyl carbonate.— A solution of 16 g. (0.1 mole) 1-phenyl-3-methyl-1-butyn-3-ol and 12 ml. pyridine in 100 methylene chloride was cooled to −10° C. and treated dropwise with a solution of 15.2 ml. phenyl chloroformate in 50 ml. methylene chloride. After addition was complete, the mixture was stirred at 0° for 7 hours and stored at 4° C. overnight. The mixture was poured into 150 ml. ice water and the methylene chloride layer separated. The aqueous layer was extracted with 75 ml. methylene chloride, the organic layers combined, washed twice with 100 ml. water, dried over anhydrous $Na_2SO_4$, and evaporated to an oil in vacuo. Crystallization from 100 ml. pet-ether (30–60) afforded 12.5 g. (44.6 percent) of 1-phenyl-3-methyl-1-butyn-3-yl phenyl carbonate, M.P. 61.5–63° C.

EXAMPLE 2

3 - methyl - 1 - butyn - 3-yl 2,4,5-trichlorophenylcarbonate.—A solution of 104 g. (0.4 mole, of 2,4,5-trichlorophenylchloroformate in 70 ml. of methylene chloride was added dropwise to a stirred solution of 33.6 g. (0.4 mole) of 3-methyl-1-butyn-3-ol and 31.6 g. (0.4 mole) of pyridine in 100 ml. of methylene chloride. As the reaction proceeded the temperature rose to 30–35° C. and toward the end of the addition, a precipitate began to form. After stirring at room temperature overnight, 100 ml. of ice water was added, the cold mixture stirred 15 minutes and filtrate, the aqueous layer washed with 70 ml. of methylene chloride and the methylene chloride layers combined. The combined methylene chloride solutions were washed twice, each with 70 ml. of water, 50 ml. of 2 N HCl and 70 ml. of water, and dried over anhydrous $Na_2SO_4$. The methylene chloride was removed in vacuo and the residual solid crystallized from 25 ml. of methylene chloride, 50 ml. of methanol and 70 percent aqueous methanol (30 ml.) to give after collection and drying in vacuo 57.4 g. (46.6 percent) M.P. 82–82.5° C.

Elmenetal analysis calculated for $C_{12}H_9O_3Cl_3$.—
Theory (percent): C, 46.85; H, 2.94; O, 1562; Cl, 34.59.
Found (percent): C, 46.65; H, 3.02; O, 15.82; Cl, 34.51.

EXAMPLE 3

3-methyl-1-butyn-3-oxycarbonyl chloride.—To a solution of phosgene, 40 g. (400 moles) in 400 ml. benzene, was added a solution of 8.9 g. (.106 mole) 3-methyl-1-butyn-3-ol and 12 g. (.152 mole) of pyridine in 200 ml. of benzene and 400 ml. of ether. The addition was made dropwise over a two-hour period with stirring and sufficient cooling to keep the temperature below 20° C. The mixture was stirred for an additional two hours at room temperature, the pyridine hydrochloride was filtered and the filtrate poured into 500 ml. of ice water. The organic layer was separated, was washed with 500 ml. of water, dried over $MgSO_4$ and evaporated in vacuo to an oil. The oil was used without further purification.

EXAMPLE 4

1-ethynyl-1-cyclohexanyloxycarbonyl chloride.—To a solution of 33.3 g. (0.33 mole) of phosgene in 50 ml. of ether and 200 ml. of benzene was added dropwise at −5° C. over a period of two hours a solution of 12.4 g. (.001 mole) of 1-ethynyl-1-cyclohexanol, and 12 g. (0.152 mole) of pyridine in 200 ml. of benzene and 400 ml. of ether. The temperature of the reaction mixture was maintained at 0° C. throughout the addition and for an additional 2 hours thereafter. The pyridine hydrochloride was filtered and the filtrate was poured into 500 ml. of ice water. The organic layer was separated, was washed twice with 100 ml. portions of water and dried over $Na_2SO_4$. Filtration and evaporation in vacuo below room temperature yielded 45 g. of product mixed with solvent. The mixture was used without further purification assuming a composition of .090 mole of product.

EXAMPLE 5

3 - methyl - 1 - pentyl-3-yl 2,4,5-trichlorophenylcarbonate.—A solution of 6.50 g. (25 mmole) of 2,4,5-trichlorophenylchloroformate in 15 ml. of methylene chloride was added dropwise over a period of one hour to a solution of 2.45 g. (25 mmole) of 3-methyl-1-pentyn-3-ol and 1.98 g. (25 mmole) of pyridine in 15 ml. of methylene chloride. The reaction mixture was stirred throughout the addition at a temperature of 0–5° C. and thereafter allowed to stand at room temperature overnight. Pyridine hydrochloride was filtered and the filtrate was poured into 50 ml. of ice water. After stirring for 10 min. the methylene chloride layer was separated and was washed twice with 50 ml. portions of water and then dried over anhydrous sodium sulfate. The dried methylene chloride solution was then evaporated to dryness in vacuo to yield the crude reaction product as a solid residue. The residue was crystallized from pentane to give 3.81 g. (47.4 percent) of 3-methyl-1-pentyn-3-yl 2,4,5-trichlorophenyl carbonate melting at about 50–55° C. Recrystallization from methanol-water gave product melting at about 55–57° C. which analyzed as follows for $C_{13}H_{11}O_3Cl_3$.

Theory (percent): C, 48.55; H, 3.45; Cl, 33.08. Found (percent): C, 48.38; H, 3.69; Cl, 33.42.

EXAMPLE 6

N - (1 - ethynyl - 1 - cyclohexanyloxycarbonyl) - L-methionine dicyclohexylamine salt.—To a solution of 11.6 g. (77.8 mmoles) of L-methionine and 11.0 g. (104 mmoles) of $Na_2CO_3$ in 165 ml. of water at a temperature of 0–5° C. were added 90 mmoles of 1-ethynyl-1-cyclohexanyloxycarbonyl chloride and the mixture stirred for 20 hours at a temperature of 0–5° C. The mixture was extracted three times with ether and the aqueous solution acidified to pH 1 with conc. HCl. The oil was extracted with three 100-ml. portions of ethyl acetate and the extracts were washed with three 100-ml. portions each of water, 10 percent NaCl and dried over anhydrous $Na_2SO_4$. The ethyl acetate was evaporated in vacuo, the residual oil dissolved in 100 ml. of ether and 14 g. (77.3 mmoles) of N,N-dicyclohexylamine were added. The ether was evaporated in vacuo to yield an oil. The oil was triturated three times with pet-ether (30–60) and crystallized from etherpentane to give 18.23 g. (52.2 percent), M.P. 119–121° C.

Calculated for $C_{26}H_{44}N_2O_4S$.—Theory (percent): C, 64.97; H, 9.23; N, 5.83; S, 6.67. Found (percent): C, 64.94; H, 9.25; N, 5.74; S, 6.93.

EXAMPLE 7

N - (3 - methyl - 1 - butyn-3-oxycarbonyl)-L-phenylalanine dicyclohexylamine salt.—To a solution of 4.46 g. (44 mmole) of sodium carbonate in 40 ml. of water was added 3.14 g. (19.0 mmole) of L-phenylalanine and the solution obtained cooled to 5° C. To the solution was adde 3 g. (20.4 mmole) of 3-methyl-1-butyn-3-oxycarbonyl chloride and the solution stirred at 0–5° C. for 2 hours. The solution was extracted twice with 100 ml. of the slow addition of conc. HCl with stirring. The oily product which formed was extracted with three 100-ml. portions of ethyl acetate and the extract was washed with 100 ml. of a 10 percent NaCl solution and dried over anhydrous $Na_2SO_4$. The ethyl acetate extract was evaporated to provide an oil which when dissolved in ether and treated with 3.44 g. (19.0 mmole) of dicyclohexylamine produced an immediate precipitate of the amine salt. The product was collected, washed with pet-ether and air dried to give 6.11 g. (70.5 percent), M.P. 205–206° C., $[\alpha]_D^{25}$ +44.351 (C., 2% MeOH).

EXAMPLE 8

N-(3-methyl-1-butyn-3-oxycarbonyl)-L-methionine dicyclohexylamine salt.—To a solution of 13.82 (.093 mole) of L-methionine and 11.4 g. (.11 mole) of $Na_2CO_3$ in 200 ml. of water at 4° C. was added with stirring 14.65 g. (.097 mole) of 3-methyl-1-butyn-3-oxycarbonyl chloride and the mixture stirred overnight while warming to room temperature. The mixture was extracted twice with 100-ml. portions of ether and the aqueous layer acidified to pH 2 with conc. HCl. The oil was extracted three times with 100-ml. portions of ethyl acetate, washed with 10 percent NaCl solution and dried over anhydrous $Na_2SO_4$. The ethyl acetate was removed in vacuo, the residual oil triturated with pet-ether (30–60) and then dissolved in 50 ml. ether. To the ethereal solution was added 16.7 g. (.093 mole) of N,N-dicyclohexylamine. On warmth, crystals began to separate and the mixture was stored at 4° C. for 3 hours. The crystalline precipitate was collected and washed with ether to give 31.38 g. 32.7 percent, M.P. 117–119° C.

Calculated for $C_{23}H_{40}N_2O_4S$.— Theory (percent): C, 62.69; H, 9.15; N, 6.36; S, 7.28. Found (percent): C, 62.79; H, 9.00; N, 6.38; S, 7.55.

EXAMPLE 9

N-(3-methyl-1-butyn-3-oxycarbonyl)-D-α-phenylglycine dicyclohexylamine salt.—A mixture of 9.06 g. (60 mmoles) of D-phenylglycine, 20.5 g. (69 mmoles) of 3-methyl-1-butyn-3-yl 2,4,5-trichlorophenylcarbonate, 21 ml. (150 mmoles) of triethylamine, 48 ml. of water and 72 ml. of t-butanol was heated at 60–65° C. for 2 hours. The solution was evaporated in vacuo to an oil, 100 ml. of water was added to the oil and the pH of the mixture was adjusted to pH 3 with 10 percent citric acid. The resulting oil was extracted into 150 ml. ethyl acetate and the extract was washed with a 10 percent solution of NaCl, and extracted with five 100 ml. portions of conc. $NaHCO_3$. The bicarbonate layer was acidified to pH 3 with a 10 percent citric acid solution, the oil extracted with 150 ml. ethyl acetate and dried over anhyd $Na_2SO_4$. The ethyl acetate was evaporated in vacuo to yield a residual oil. The oil was dissolved in 100 ml. ether and treated with a solution of 10.8 g. (60 mmoles) of dicyclohexylamine in 50 ml. ether. On slow addition of 100 ml. of pentane, a crystalline precipitate separated and after 2 hours was collected to give 19.5 g. (73.5 percent) M.P. 138–140° C. $[\alpha]_D^{25}$ −76.62 (C., 2 MeOH).

Elemental analysis calculated for $C_{26}H_{38}N_2O_4$.—Theory (percent): C, 70.56; H, 8.65; N, 6.33; O, 14.46. Found (percent): C, 70.46; H, 8.87; N, 6.42; O, 14.31.

EXAMPLE 10

N-(3-methyl-1-butyn-3-oxycarbonyl)-L-tryptophane dicyclohexylamine salt.—A mixture of 40.8 g. (0.2 mole) of L-tryptophane, 72 g. (0.23 mole) of 3-methyl-1-butyn-3-yl 2,4,5-trichlorophenylcarbonate, 160 ml. of water, 240 ml. of t-butanol, and 70 ml. (.5 mole) of triethylamine was stirred for 2 hours at 55–65° C. The mixture was evaporated to an oil in vacuo and 300 ml. of water were added to the residual oil. The solution was washed with 500 ml. of ethyl acetate, and the aqueous layer was acidified to pH 3 with citric acid. The resulting oil was extracted with 1 liter of ethyl acetate and the extract was washed successively with a 10 percent solution of citric acid and a 10 percent solution of sodium chloride and was dried over anhyd. $MgSO_4$. The dried extract was evaporated to yield an oil. The oil was dissolved in 800 ml. of ether and was treated slowly with 39.2 ml. (0.2 mole) of dicyclohexylamine with stirring. After 2 hours the crystalline precipitate of the amine salt was filtered and washed with ether to yield 76 g. (76.5 percent), M.P. 178.5–180° C., $R_f$ .294 $(CHCl_3:MeOH—HOAc)$ (135:15:1) $[\alpha]_D^{25}$ −26.354 (C., 2 percent MeOH).

Elemental analysis calculated for $C_{29}H_{42}N_3O_4$.—Theory (percent): C, 70.27; H, 8.34; N, 8.48; O, 12.91. Found (percent): C, 70.02; H, 8.59; N, 8.69; O, 12.78.

EXAMPLE 11

N-(3-methyl-1-butyn-3-oxycarbonyl)-L-glutamine dicyclohexylamine salt.—A mixture of 29.2 g. (0.2 mole) of L-glutamine, 72 g. (0.23 mole) of 3-methyl-1-butyn-3-yl 2,4,5-trichlorophenylcarbonate, 160 ml. of water, 240 ml. of t-butanol and 70 ml. (0.5 mole) of triethylamine was stirred at 60–65° C. for 18 hours. The mixture was evaporated to an oil in vacuo and the oil was treated with 600 ml. of water and was then washed 3 times with 200 ml. of ethyl acetate. The aqueous layer was acidified to pH 3 with a 10 percent solution of citric acid and then saturated with sodium chloride and thereafter extracted 10 times with 500 ml. of ethyl acetate. The ethyl acetate extract was dried over anhyd. $MgSO_4$ and evaporated in vacuo. To the residue was added 400 ml. of ethanol and the mixture was filtered and the filtrate treated with 39.2 ml. (0.2 mole) dicyclohexylamine. Crystallization of the product was induced by the slow addition of ether and overnight storage at room temperature. The precipitate was filtered and washed with ether to yield 71 g. (81 percent), M.P. 152–154° C., $R_f$ .51 (n-butanol-HOAc-$H_2O$-pyridine (30:6:24:20), $[\alpha]_D^{25}$ −12.30 (C., 2 percent MeOH).

Elemental analysis calculated for $C_{23}H_{39}N_3O_5$.—Theory (percent): C, 63.13; H, 8.98; N, 9.60. Found (percent): C, 62.98; H, 8.97; N, 9.70.

EXAMPLE 12

N-(3-methyl-1-butyn-3-oxycarbonyl)-L-valine dicyclohexylamine salt.—A mixture of 2.34 g. (20 mmoles) of L-valine, 7.2 g. (23 mmoles) of 3-methyl-1-butyn-3-yl, 2,4,5-trichlorophenyl-carbonate, 24 ml. of t-butanol, 16 ml. of water and 7 ml. (50 mmole) of triethylamine was stirred at 60–65° C. for 3 hours. The mixture was evaporated in vacuo, and the residue was dissolved in 50 ml. of water. The solution was washed 3 times with 50 ml. of ethyl acetate, and was then acidified to pH 3 with a 10 percent solution of citric acid. An oily material separated and was extracted with 200 ml. of ethyl acetate. The ethyl acetate solution was washed with 10 percent citric acid, a saturated solution of sodium chloride was dried over $MgSO_4$ and then evaporated in vacuo. The resulting oil was treated with 4.0 ml. of dicyclohexylamine in 50 ml. of ethanol with warming on the steam bath. The ethanol was removed in vacuo and the product crystallized from pet. ether (30–60). The crystalline precipitate was filtered and washed with cold pet. ether to afford 5.13 g. (63 percent), M.P. 126–128° C. TLC, $R_f$ .405

$(CHCl_3—MeOH:HOAc)$

135:15:1, $[\alpha]_D^{25}$ −.250 (C., 2 percent MEOH).

Elemental analysis calculated for $C_{23}H_{40}N_2O_4$.—Theory (percent): C, 67.61; H, 9.87; N, 6.86. Found (percent): C, 67.86; H, 9.80; N, 6.61.

EXAMPLE 13

N-(3-methyl-1-butyn-3-oxycarbonyl)-L-methionine dicyclohexylamine salt.—A mixture of 29.8 g. (0.2 moles) of L-methionine, 72 g. (0.23 moles) of 3-methyl-1-butyn-3-yl 2,4,5-trichlorophenylcarbonate, 160 ml. of water, 240 ml. of t-butanol and 70 ml. (0.5 mole) of triethylamine was stirred 18 hours at 50–55° C. The solution was evaporated in vacuo and 300 ml. of water were added to the residue. The solution was washed 3 times with 500 ml. of ether, and then acidified to pH 3 with a saturated solution of citric acid. An oil separated and was extracted with 1 liter of ethyl acetate. The ethyl acetate solution was washed 3 times with water before drying over anhd. MgSO$_4$. The dried extract was evaporated to yield a residual oil which was dissolved in 400 ml. of ether. The ether solution was treated with 39.2 ml. (0.2 mole) of dicyclohexylamine. After overnight storage at room temperature the crystalline precipitate of the amine salt was collected, washed with pet. ether (30–60) and dried in vacuo over HaOH to give 67 g. (78.5 percent) M.P. 116–118° C., $[\alpha]_D^{25}$ −15.273 (C., 2 MeOH).

Elemental analysis calculated for $C_{23}H_{40}N_2O_4S$.—Theory (percent): C, 62.69; H, 9.15; N, 6.36; S, 7.28. Found (percent): C, 62.58; H, 9.40; N, 6.17; S, 7.23.

EXAMPLE 14

N - (3 - methylbutynyl-3-oxycarbonyl)-S-trityl-L-cysteine dicyclohexylamine salt.—A mixture of 3.64 g. (10 mmole) of S-trityl-L-cysteine, 3.53 g. (11.5 mmole) of 3-methyl-1-butyn-3-yl 2,4,5-trichlorophenylcarbonate, 3.50 ml. (25 mmoles) of triethylamine, 8 ml. of water, and 12 ml. of t-butanol was stirred at 60° C. for 2 hours. The solution was evaporated in vacuo to a gum, and 15 ml. of water were added and the mixture acidified to pH 3 with citric acid. The acidified mixture was extracted with 65 ml. of ethyl acetate and the organic layer separated. The organic solution was washed consecutively with saturated sodium chloride, four times with 1 N sodium bicarbonate, 15 ml. of a saturated salt solution, and was then dried over Na$_2$SO$_4$. The solution was filtered and treated with a solution of 1.81 g. (10 mmoles) of N,N-dicyclohexylamine in 75 ml. ether. Fifty ml. of pet.-ether were added and the solution brought to the boiling point before cooling. On scratching the surface of the flask, crystals began to separate. The mixture was diluted to a volume of 300 ml. with ether and then cooled to 4° C. to give 4.22 g. (64 percent), M.P. 177.5–179° C. decomp.

Elemental analysis calculated for $C_{40}H_{50}N_2O_4S$.—Theory (percent): C, 73.36; H, 7.70; N, 4.28; O, 9.77; S, 4.89. Found (percent): C, 72.70; H, 8.00; N, 4.39; O, 10.22; S, 4.80.

EXAMPLE 15

1 - phenyl - 3 - methyl-1-butyn-3-oxycarbonyl-L-methionine dicyclohexylamine salt.—A solution of 1.49 g. (10 mmoles) of L-methionine, in 4.7 ml. of Triton (40 percent in methanol) was evaporated to an oil in vacuo. The oil was treated twice with 8 ml. of DMF and evaporated each time in vacuo. To the residue was added a solution of 2.8 g. (10 mmoles) of 1-phenyl-3-methyl-1-butyn-3-yl phenyl carbonate in 8 ml. of DMF and the mixture was stirred for 65 hours. The solution was added to 90 ml. of water and after stirring for 5 minutes was extracted twice with 35 ml. portions of ether. The aqueous layer was acidified to pH 3 with citric acid at 0° C. and allowed to stir for 30 minutes. The solid was collected, dissolved in 75 ml. of ether and dried over anhydrous Na$_2$SO$_4$. The dried ether solution was evaporated in vacuo to yiel a residual oil. The resulting oil was dissolved in 75 ml. of ether and the solution treated with 1.81 g. (10 mmoles) of N,N-dicyclohexylamine and stored at 4° C. for 2.5 hours. The crystalline precipitate was filtered and was washed with ether and dryed in vacuo to give 3.36 g. (65 percent), M.P. 132–133.5° C.

Elemental analysis calculated for $C_{29}H_{44}N_2O_4S$.—Theory (percent): C, 67.41; H, 8.58; N, 5.42; S, 6.20. Found (percent): C, 67.51; H, 8.70; N, 5.31; S, 6.25.

EXAMPLE 16

N-(3 - methyl-1-butyn-3-oxycarbonyl)-(O-tert. butyl)-L-serine dicyclohexylamine salt.—A mixture of 28 g. (0.174 mole) of O-tert. butyl-L-serine, 63 g. (0.2 mole) of 3-methyl-1-butyn-3-yl 2,4,5-trichlorophenylcarbonate, 61 ml. (0.43 mole) of triethylamine, 240 ml. of t-butanol and 160 ml. of water was stirred at 45–55° C. overnight. The mixture was evaporated in vacuo to an oil. The residual oil was dissolved in 400 ml. of water and was washed with ethyl acetate and thereafter acidified to pH 3 with a solution of citric acid. The product was extracted from the acidified solution with ethyl acetate, and the extract was washed consecutively with a solution of citric acid and a saturated salt solution, and then dried over Na$_2$SO$_4$. The dried extract was evaporated to yield a residual oil. The resulting oil was dissolved in 300 ml. of ether and the etheral solution was treated with 34 ml. of N,N-dicyclohexylamine and the solution boiled on the steam bath. When crystallization commenced the volume of the solution was increased initially to 300 ml. with ether and then to 600 ml. with petroleum ether and the diluted solution was stirred overnight at 4° C. The product was filtered and washed with pet. ether (30–60), dried in vacuo over KOH to give 57 g. (72 percent) M.P. 146–148; TLC showed one spot (chlorine toluidine) R$_f$ .30

[CHCl$_3$:MeOH:HOAc(135:15:1)]

$[\alpha]_D^{25}$ −25.8 (c., 2% MeOH).

Elemental analysis calculated for $C_{25}H_{44}N_2O_5$.—Theory (percent): C, 66.34; H, 9.80; N, 6.19. Found (percent): C, 66.12; H, 9.70; N, 6.21.

Preparation of alkynylcarbinyloxcarbonyl protected amino acid active esters.

EXAMPLE 17

2,4,5-trichlorophenyl-N-(3-methyl - 1 - butyn-3-oxycarbonyl)-L-tryptophinate.—A mixture of 4.08 g. (20 mmoles) of L-tryptophane, 6.84 g. (23 mmoles) of 3-methyl-1-butyn-3-yl 2,4,5-trichlorophenylcarbonate, 7 ml. (50 mmoles) of triethylamine, 16 ml. of water and 24 ml. of t-butanol was heated with stirring at 60–65° C. for 1.75 hours. The solution was evaporated in vacuo to a thick syrup which was treated with 30 ml. of water and acidified to pH 3 with a 10 percent solution of citric acid. The acidized solution was extracted with two 50-ml. portions of ethyl acetate and the extract was washed twice with 50-ml. portions of a 10 percent salt solution. A washed extract was dried and evaporated to an oil in vacuo. The oil was dissolved in ethyl acetate (60 ml.) and the solution was cooled to 0° C. To the cold solution was added 4.28 g. (21 mmoles) of N,N-dicyclohexylcarbodiimide and the mixture stirred overnight while warming to room temperature. The urea side product was filtered and the filtrate was evaporated to an oil in vacuo. Crystallization from ethyl acetate-pentane afforded 7.74 g. (78.5 percent), M.P. 123–125° C.

Elemental analysis calculated for $C_{23}H_{19}N_2O_4Cl_3$.—Theory (percent): C, 55.95; H, 3.88; N, 5.67; Cl, 21.54. Found (percent): C, 55.88; H, 4.08; N, 5.65; Cl, 21.26.

EXAMPLE 18

2,4,5-trichlorophenyl-N-(3-methyl - 1 - butyn-3-oxycarbonyl)-D-α-phenylglycinate.—A mixture of 4.53 g. (30 mmoles) of D-α-phenylglycine, 10.25 g. (34.5 mmole) of 3-methyl-1-butyn-3-yl-2,4,5 - trichlorophenylcarbonate, 10.5 ml. (75 mmoles) of triethylamine, 24 ml. of water and 36 ml. of t-butanol was heated with stirring at 60–65° C. for 2.75 hours. The solution was evaporated in vacuo to a thick syrup and 45 ml. of water were added. The aqueous solution was acidified to pH 3 with citric acid and then was extracted with two 50-ml. portions of ethylacetate. The ethylacetate extract was washed twice with 60-ml. portions of a 10 percent salt solution and was then dried over Na$_2$SO$_4$. The dried extract was evaporated to an oil in vacuo. Ethyl acetate (90 ml.) was added, and the solution was cooled to 0° C. To the cold solution was added 6.42 g. (31.5 mmoles) of N,N-dicyclohexylcarbodiimide and the mixture stirred overnight while warming to room temperature. The urea was filtered and the filtrate was evaporated in vacuo to oil. The oil was dissolved in 15 ml. of ethyl acetate followed by the addition of 250 ml. of pet.-ether (30–60). Crystallization of the product was induced by scratching the walls of the flask. Yield, 9.71 g. (73.6 percent) of product melting at about 69–71° C.

Elemental analysis calculated for $C_{20}H_{16}NO_4Cl_3$.— Theory (percent): C, 54.37; H, 3.54; N, 3.27; Cl, 24.23. Found (percent): C, 54.72; H, 3.95; N, 3.42; Cl, 24.20.

EXAMPLE 19

2,4,5-trichlorophenyl N-(3-methyl - 1 - butyn-3-oxycarbonyl)-S-benzyl-L-cysteinate.—A mixture of 2.11 g. (10 mmole) of S-benzyl-L-cysteine, 3.53 g. (11.5 mmoles) of 3-methyl-1-butyn-3-yl 2,4,5-trichlorophenylcarbonate, 3.5 ml. (25 mmoles) of triethylamine, 8 ml. of water and 12 ml. of t-butanol was heated at 60–65° C. for two hours with stirring. The solution was evaporated in vacuo to an oil and 15 ml. water were added. The solution was acidified to pH 3 with 10 percent citric acid. The acidified solution was extracted with two 25-ml. portions of ethyl acetate. The ethyl acetate extracts were combined and washed with two 25-ml. portions of saturated sodium chloride solution and dried over $Na_2SO_4$. The dried extract was evaporated to an oil in vacuo. Ethyl acetate (30 ml.) was added, the solution cooled to 0° C. and 2.14 g. (10.5 mmole) of N,N-dicyclohexylcarbodiimide were added and the mixture stirred overnight while warming to room temperature. The urea was filtered and the filtrate evaporated in vacuo to an oil. Crystallization of the product was attained from ethyl acetate, pet.-ether (30–60). The crystalline product was filtered and washed with pet.-ether (30–60) to yield 2.17 g. (55 percent), M.P. 59–62° C.

Elemental analysis calculated for $C_{22}H_{20}NO_4Cl_3S$.— Theory (percent): C, 52.76; H, 4.03; N, 2.80; O, 12.78; Cl, 21.24; S, 6.40. Found (percent): C, 52.66; H, 4.26; N, 2.99; O, 11.75; Cl, 22.23; S, 6.67.

EXAMPLE 20

2,4,5-trichlorophenyl N-(3-methyl - 1 - butyn-3-oxycarbonyl)-S-benzhydryl-L-cysteinate.—A mixture of 5.75 g. (20 mmole) of S-benzhydryl-L-cysteine, 7.07 g. (23 mmole) of 3-methyl-1-butyn-3-yl 2,4,5-trichlorophenylcarbonate, 7 ml. (50 mmole) of triethylamine, 8 ml. of water and 24 ml. of t-butanol was heated at 60–65° C. for 2 hours with stirring. The solution was evaporated to an oil in vacuo, and 30 ml. of water were added. The solution was acidified to pH 3 with 10 percent citric acid and the acidic solution was extracted with two 50-ml. portions of ethyl acetate. The ethyl acetate extract was washed with two 30-ml. portions of a saturated solution of sodium chloride and was then dried over $Na_2SO_4$. The dried extract was evaporated in vacuo to an oil. Ethyl acetate (30 ml.) was added and the solution was cooled to 0° C. To the cold solution was added 4.3 g. (21 mmoles) of N,N-dicyclohexylcarbodiimide and the mixture stirred overnight while warming to room temperature. The urea was filtered and the filtrate evaporated in vacuo to an oil. Crystallization of the product was effected from 50 ml. of hot ethyl acetate and 325 ml. pet-ether (30–60). The precipitate was filtered and washed with pet-ether (30–60) to give 6.92 g. (61 percent), M.P. 128–131° C.

Elemental analysis calculated for $C_{28}H_{24}NO_4Cl_3S$.— Theory (percent): C, 58.29; H, 4.19; N, 2.43; O, 11.09; Cl, 18.44; S, 5.56. Found (percent): C, 58.59; H, 4.45; N, 2.59; O, 10.83; Cl, 18.31; S, 5.39.

EXAMPLE 21

2,4,5-trichlorophenyl N-(3-methyl - 1 - butyn-3-oxycarbonyl)-L-methioninate.—A mixture of 2.98 g. (20 mmole) of L-methionine, 6.84 g. (23 mmole) of 3-methyl-1-butyn-3-yl 2,4,5-trichlorophenylcarbonate, 7 ml. (50 mmole) of triethylamine, 16 ml. of water and 24 ml. of t-butanol was heated with stirring at 60–65° C. for 2 hours. The solution was evaporated in vacuo to obtain an oil. The oil was dissolved in 30 ml. of water and the solution was acidified to pH 3 with citric acid. The acidic solution was extracted wtih two 50-ml. portions of ethyl acetate. The ethyl acetate extracts were combined and washed with two 20-ml. portions of water and was then dried over $Na_2SO_4$. The extract was evaporated to obtain an oil. Ethyl acetate (60 ml.) was added to the oil and the solution was cooled to 0° C., and 4.28 g. (21 mmoles) of N,N-dicyclohexylcarbodiimide were added and the mixture stirred overnight with warming to room temperature. The urea was filtered and the filtrate evaporated in vacuo to an oil. The reaction product was obtained crystalline by dissolving the oil in 10 ml. of cyclohexane and 10 ml. of hot ethyl acetate and adding 200 ml. pet-ether (30–60) to the hot solution. The crystalline product was filtered and washed with ether to afford after drying in vacuo over $P_2O_5$, 6.50 g. (74.1 percent), M.P. 97–98° C.

Elemental analysis calculated for $C_{17}H_{18}NO_4Cl_3S$.— Theory (percent): C, 46.54; H, 4.14; N, 3.19; O, 14.59; Cl, 24.24; S, 7.31. Found (percent): C, 46.48; H, 4.30; N, 3.38; O, 14.40; Cl, 24.09; S, 7.59.

EXAMPLE 22

N-hydroxysuccinimide ester of N-(3-methyl-1-butyn-3-oxycarbonyl)-L-phenylalanine.—N-(3-methyl - 1 - butyn-3-yl-3-oxycarbonyl) - L - phenylalanine N,N-dicyclohexylamine salt, 4.56 g. (.01 mole) was suspended in 20 ml. of ethyl acetate and the solution was shaken two times with 20 ml. each of 10 percent citric acid, and 20 ml. of a 10 percent salt solution. The washed solution was dried over anhydrous $Na_2SO_4$ and then evaporated in vacuo. The residue was dissolved in 25 ml. of THF and the solution was treated with 1.15 g. (0.01 mole) of N-hydroxysuccinimide followed by 2.06 g. (0.01 mole) of N,N-dicyclohexylcarbodiimide. The mixture was stirred for three hours at 0° C. and then was stored at 4° C. overnight. The dicyclohexylurea was filtered and the filtrate evaporated in vacuo to obtain a foam. Crystallization of the product from chloroform-pet-ether (30–60) gave 3.0 g. (78 percent), M.P. 128–130° C.

Elemental analysis calculated for $C_{19}H_{20}N_2O_6$.— Theory (percent): C, 61.28; H, 5.41; N, 7.52; O, 25.78. Found (percent): C, 61.07; H, 5.68; N, 7.79; O, 25.50.

PREPARATION OF PEPTIDES OF THE FORMULA III

The following examples are illustrative of the method of peptide synthesis of this invention.

EXAMPLE 23

N-(3-methyl - 1 - butyn - 3 - oxycarbonyl) - L - tryptophyl-L-leucine methyl ester.—N-(3-methyl-1-butyn-3-oxycarbonyl)-L-tryptophane dicyclohexylamine salt, 37.18 g. (75 mmole) was suspended in 150 ml. of ethyl acetate and the suspension was shaken two times with 100-ml. portions of a 10 percent citric acid solution and a 10 percent sodium chloride solution. The washed solution was then dried over $Na_2SO_4$ and the dried solution was evaporated in vacuo to obtain an oil. The oil was dissolved in 50 ml. of DMF and the solution cooled to −15° C. The cold solution was added to a previously prepared solution of 9.10 g. (50 mmole) of L-leucine methyl ester hydrochloride and 5.5 ml. (50 mmole) of N-methyl morpholine in 50 ml. of DMF at −15° C. The mixture was stirred overnight at −13° C. and treated with a solution of 2.1 g. (25 mmole) of $NaHCO_3$ in water. After several hours the solution was poured into 1.5 liters of a cold sodium chloride solution while stirring. The resulting gum was extracted with 500 ml. of ethyl acetate and the extract was washed twice with 200 ml. of a 1 N $NaHCO_3$ solution, three times with 200 ml. of water and was then dried over Na₂SO₄. The dried extract was evaporated in vacuo and the residue was crystallized from ether-pet-ether to give 14.11 g. of product as an amorphous solid. TLC, one spot (chlorine-toluidine); $R_f$ .81

[CHCl₃:MeOH:HOAc(75:24:1)];

NMR (CDCl₃) δ .84(M,7,γCH₃ and γCH Leu), 1.43 (M,2,βCH₂ Leu), 4.52 (g, αCH Trp), 5.41 (M, αCH Leu), 6.13 (d, αNH Trp), 8.30 (M, αNH Leu).

Elemental analysis calculated for $C_{24}H_{31}N_3O_5$.— Theory (percent): C, 65.29; H, 7.08; N, 9.52; O, 18.12. Found (percent): C, 65.36; H, 7.20; N, 9.68; O, 18.03.

EXAMPLE 24

N-(3 - methyl-1-butyn - 3 - oxycarbonyl)-O-t-butyl-L-seryl-L-arginyl - L - arginyl - L - alanyl-L-glutaminyl-β-t-butyl-L-aspartate dihydrochloride.—A suspension of 2.53 g. of N-(3 - methyl-1-butyn-3-oxycarbonyl)-O-t-butyl-L-serine dicyclohexylamine salt in ethyl acetate was shaken with a 10 percent solution of citric acid and then with a 10 percent salt solution. The washed solution was dried over Na₂SO₄ and then evaporated in vacuo to an oil. The oil was dissolved in 15 ml. of DMF and the solution cooled to —15° C. To the cold solution were added 0.61 ml. N-methylmorpholine and 0.69 ml. of isobutyl chloroformate and the solution stirred for 15 minutes at —15° C. The reaction mixture was poured into a previously prepared cold solution (—15° C.) of 3.05 g. (3.5 mmole) of L - arginyl - L - arginyl - L - alanyl-L-glutaminyl-β-t-butyl-L-aspartate dihydrochloride in 25 ml. of DMF and 5 ml. of acetic acid. The mixture was stirred at —15° C. for 4 hours and then stored at —15° C. for 66 hours. Cold ether (800 ml.) was added, the product was filtered and washed on the filter with ether and a saturated sodium chloride solution. The product was dissolved in methanol and the solution evaporated in vacuo to dryness. The residual product was dried by azeotropic removal of water with 20 ml. of added benzene. Remaining traces of salt were removed by dissolving the dried product in hot DMF, and filtering the hot solution. The filtered solution was then evaporated in vacuo. The residual product was dissolved in methanol and obtained as a crystalline precipitate by the addition of ether. The product was filtered and dried in vacuo to give 2.57 g. (71.5 percent). TlC (chlorinetoluidine); $R_f$ .39 [Butanol's Acetic Acid:water 100(:10:31]; NMR (DMSO) δ 1.11 (S, 9 O-t-butylether), 1.37 (S, 9 O-t-butyl ester), 1.60 [S, 6=C(CH₃)₂ 3.41 (S, =C–H); quantitative amino acid analysis, acid hydrolysis, Asp.(96), Ser(.76), Glu(.95), Ala(1.00), Arg (1.97).

Elemental analysis calculated for $C_{41}H_{73}N_{13}O_{13}Cl_2$.— Theory (percent): C, 47.95; H, 7.16; N, 17.73; O, 20.25; Cl, 6.90. Found (percent): C, 47.69; H, 7.36; N, 17.81; O. 20.50; Cl, 6.66.

EXAMPLE 25

N-(3 - methyl - 1 - butyn - 3 - oxycarbonyl)-S-benzhydryl-L-cysteinylglycine ethyl ester.—To a stirred mixture of 2.88 g. (5 mmole) of N-(3-methyl-1-butyn-3-oxycarbonyl)-S-benzhydryl - L - cysteine 2,4,5-trichlorophenyl ester and 0.7 g. of (5 mmole) of glycine ethyl ester in 80 ml. of methylene chloride was added over a period of one hour a solution of 0.7 ml. (5 mmole) of triethylamine in 20 ml. of methylene chloride. After stirring overnight at room temperature the solvent was evaporated in vacuo to an oily residue. The oil was dissolved in ethyl acetate and filtered to remove triethylamine-hydrochloride. The ethyl acetate filtrate was evaporated in vacuo and the resulting oil was crystallized from ethyl acetate pet-ether and dried in vacuo to give 1.41 g. 58.3 percent, M.P. 98–100° C. TLC, one spot (chlorine-toluidine), $R_f$.82

[CHCl₃:MeOH:HOAx(75:24:1)]

Elemental analysis calculated for $C_{26}H_{30}N_2O_5S$.— Theory (percent): C, 64.71; H, 6.27; N, 5.80; S, 6.64. Found (percent): C, 64.75; H, 6.43; N, 5.75; S, 6.78.

EXAMPLE 26

Ethyl N-(3 - methyl - 1 - butyn-3-oxycarbonyl)-S-trityl-L-cysteinyl-glycinate.—To 4.99 g. (1.63 mmole) of N-(3-methyl-1-butyn - 3 - oxycarbonyl-S-trityl-L-cysteine dicyclohexylamine salt and 1.07 g. (7.63 mmole) of glycine ethyl ester hydrochloride in 15 ml. of methylene chloride at 0° C. was added with stirring 1.57 g. (7.63 mmoles) of N,N-dicyclohexylcarbodiimide. Stirring was continued at 0° C. and thereafter the reaction mixture was allowed to warm to room temperature overnight. The dicyclohexylurea was filtered and the filtrate evaporated in vacuo to a foam. The foam was dissolved in 30 ml. of ethyl acetate and the solution was washed with 10 ml. each of a 1 N NaHCO₃ solution, brine, a 10 percent citric acid solution and a 10 percent salt solution. The washed solution was dried over Na₂SO₄, was filtered and evaporated in vacuo to give 3.52 g. (82.6 percent) of a white fluffy foam which resisted crystallization attempts. NMR(CDCl₃) 1.25 (t,3,J=7H₂OCH₂CH₃), 1.66 (S,6,C≡C(CH₃)₂O), 2.49 (S,1,H—C≡C—), 2.67 (doublet or doublets, 2, J=6 and 7, H_z, —CH₂S—), 3.95 (d,2,J=7H_z, OCONH—), 6.49 (m,1,CONH—), 7.35 (M,15φ).

Elemental analysis calculated for $C_{32}H_{34}N_2O_5S$.— Theory (percent): C, 68.80; H, 6.14; N, 5.02; O, 14.31; S, 5.73. Found (percent): C, 68.56; H, 6.42; N, 5.00; O, 14.28; S, 5.83.

EXAMPLE 27

Ethyl N-( 3 - methyl-1-butyn-3-oxycarbonyl)-L-phenylalanyl-S-trityl-L-cysteinylglycinate.—To a mixture of 1.24 g. (2 mmole) of ethyl S-trityl-L-cysteinyl-glycinate tosylate salt and 0.912 g. (2 mmole) of N-(3-methyl-1-butyn-3-oxycarbonyl)-L-phenylalanine dicyclohexylamine salt in 10 ml. of methylene chloride was added with stirring 0.412 g. (2 mmoles) of N,N-dicyclohexylcarbodiimide at 0° C. Stirring was continued at 0° for several hours and the reaction mixture then allowed to warm to room temperature overnight. The mixture was filtered and the filtrate evaporated to dryness in vacuo. The residue was dissolved in 40 ml. of ethyl acetate and the solution filtered, and washed consecutively with 1 N NaHCO₃, 10 percent NaCl, 10 percent citric acid and 10 percent NaCl. The washed solution was dried over Na₂SO₄, was filtered and then evaporated in vacuo to dryness. The residue was crystallized from ethyl acetate-pet-ether to give 0.74 g. (52.4 percent), M.P. 181–181° C. (dec).

Elemental analysis calculated for $C_{41}H_{43}N_3O_6S$.— Theory (percent): C, 69.77; H, 6.14; N, 5.95; O, 13.60; S, 4.54. Found (percent): C, 69.51; H, 6.27; N, 6.04; O, 13.71; S, 4.67.

EXAMPLE 28

N - (3 - methyl-1-butyn-3-oxycarbonyl)-L-tryptophy-L-methionyl-L-aspartyl-L-phenylalanine amide.—A mixture of 1.165 g. (2.56 mmole) of N-(3-methyl-1-butyn-3-oxycarbonyl)-L-tryptophane 2,4,5-trichlorophenyl ester, 1.0 g. (2.33 mmole) of L-methionyl - L - aspartyl-L-phenylalanine amide monohydrate and 0.26 ml. (2.33 mmoles) of triethylamine in 15 ml. of DMF was stirred at —15° C. for 8 hours and at room temperature for 60 hours. During this period solution had occurred. The reaction solution was poured into 50 ml. of ice water and the cold aqueous solution was acidified to pH 3 with a saturated aqueous solution of citric acid. The reaction product formed as a precipitate, was filtered and was washed with water. The product was then boiled in 50 ml. of absolute ethanol to remove water and 2,4,5-trichlorophenol. The reaction product was filtered from the cooled ethanol and dried in vacuo over potassium hydroxide pellets to give 1.09 g., 66 percent yield of product melting at about 209 to 210° C. with decomposition.

Thin layer chromatography of the product showed one-spot (ninhydrin and chlorine-toluidine); $R_f$ value of 0.79 with THF:$C_6H_{12}$:$H_2O$, 94:7:5.

Elemental analysis calculated for $C_{35}H_{42}N_6O_8S$.— Theory (percent): C, 59.47; H, 5.98; N, 11.98; O, 18.10; S, 4.53. Found (percent): C, 59.15; H, 6.21; N, 11.87; O, 18.42; S, 5.00.

The reaction product, 1.01 g. (1.42 mmole) was dissolved in 20 ml. of DMF and was hydrogenated for 4 hours over 0.142 g. of 5 percent palladium on carbon. The catalyst was filtered and washed with DMF. The filtrate was decolorized with carbon and evaporated to dryness in vacuo. The hydrogenolysis product, L-tryptophyl-L-methionyl-L-aspartyl-L-phenylalanine amide, was crystallized from 20 ml. of hot DMF and 15 ml. of ethyl acetate to give 0.25 g. (17.7 percent yield) melting at about 224–226° C. Thin layer chromatogram: one spot (ninhydrin and chlorine-toluidine), $R_f$ value of 0.30 with THF:cyclohexane:water 94:7:5. Quantitative amino acid analysis following acid hydrolysis in the presence of thioglycolic acid: Trp (0.99), Asp (1.00) Met (0.93), Phe (0.90).

Elemental analysis calculated for $C_{25}H_{36}N_6O_6$.— Theory (percent): C, 58.37; H, 6.08; N, 14.08. Found (percent): C, 58.10; H, 6.38; N, 13.80.

EXAMPLE 29

N - (3-methyl-1-butyn-3-oxycarbonyl)-L-methionine-L-aspartyl-L-phenylalanine amide.—A mixture of 3.4 g. (7.75 mmole) of N-(3-methyl-1-butyn-3-oxycarbonyl)-L-methionine 2,4,5-trichlorophenyl ester and 2.16 g. (7.75 mmole) of L-aspartyl-L-phenylalanine amide in 30 ml. of DMF was cooled to 0° C. and 1.09 ml. of triethylamine was added with stirring, the reaction mixture was stirred at 0° C. for 9 hours, and thereafter at room temperature for 10 hours. The reaction mixture was then poured into a mixture of 115 ml. of ice water, 0.45 ml. of acetic acid and 39 ml. of cyclohexane. The gummy solid was filtered, was washed with water and then heated in 39 ml. of ethanol at a temperature between 50 and 60° C. The reaction product was filtered, was washed with water and dried in vacuo over KOH pellets to give 2.47 g. (61.2 percent yield) melting at about 203–204° C. with decomp.

Thin layer chromatogram: one-spot (chlorine-toluidine); $R_f$ value of 0.56 with $CHCl_3$:MeOH:HOHC, 75:24:1.

Elemental analysis calculated for $C_{24}H_{32}N_4O_7S$.— Theory (percent): C, 55.37; H, 6.20; N, 10.76; S, 6.16. Found (percent): C, 55.61; H, 6.39; N, 10.71; S, 6.37.

EXAMPLE 30

L-methionyl-L-aspartyl-L-phenylalanine amide monohydrate.—N-(3-methyl-1-butyn - 3 - oxycarbonyl-L-methionly-L-aspartyl-L-phenylalanine amide, 2.36 g. (4.53 mmole) in 200 ml. of 80 percent acetic acid was hydrogenated for 2.5 hours over 0.454 g. of 5 percent palladized charcoal. The catalyst was filtered and the filtrate evaporated to an oil in vacuo. The residual oil was azeotroped in vacuo with three 50-ml. portions of benzene and the resulting solid boiled in 50 ml. methanol, filtered, and dried in vacuo over KOH to yield 1.16 g. (62.4 percent), M.P. 211–214° C.

Elemental analysis calculated for $C_{18}H_{26}N_4O_5S \cdot H_2O$.— Theory (percent): C, 50.45; H, 6.59; N, 13.08; S, 7.48. Found (percent): C, 50.63; H, 6.86; N, 12.92; S, 7.39.

EXAMPLE 31

N - (3 - methyl - 1 - pentyn - 3 - oxycarbonyl) - L-methionyl-L-asparginyl - di - O - t-butyl-L-threonate.— A solution of 2.27 g. (5 mmole) of N-(3-methyl-1-pentyn-3-oxycarbonyl)-L-methionine dicyclohexylamine salt in 30 ml. of DMF was cooled to —15° C. and treated with 0.625 ml. of pivaloyl chloride. The mixture was stirred at —15° C. for 15 minutes and treated with a precooled solution (—15° C.) of 1.55 g. (4.5 mmole) of L-aspar-aginyl-di-O-t-butylthreoninate in 15 ml. of DMF. The mixture was stirred at 0° C. for 2.5 hours and treated with 15 ml. of a 1 N $NaHCO_3$ solution. After stirring for 5 minutes, the cold solution was poured into 145 ml. of a 90 percent solution of NaCl and stirred for 15 minutes. The resulting precipitate was filtered and washed with water and a saturation of $NaHCO_3$. The product was dissolved in 100 ml. of ethyl acetate and filtered to remove dicyclohexylamine hydrochloride. The filtrate was washed twice with 30 ml. portions of a 10 percent citric acid solution, three times with 50 ml. portions of water and then dried over $Na_2SO_4$. The dried filtrate was evaporated in vacuo to provide 1.65 g. of a solid foam. TLC, one spot (chlorine-toluidine); $R_f$ .44 [$CHCl_3$:MeOH:HOAc(75:24:1)]

Elemental analysis calculated for $C_{28}H_{48}N_4O_8S$.— Theory (percent): C, 55.98; H, 8.05; N, 9.33; O, 21.30; S, 5.34. Found (percent): C, 56.20; H, 8.22; N, 9.08; O, 21.01; S, 5.54.

EXAMPLE 32

Preparation of the 22–26 amino acid sequence of glucagon.—To a solution of 14.68 g. (21.2 mmole) of N-carbobenzoxy - L - valyl - L - glutaminyl - L - tryptophyl-L-leucine methyl ester in 600 ml. of 50 percent aqueous dioxane was added 21.2 ml. (42.4 mmole) of 2 N sodium hydroxide and the solution stirred for 17 hours to effect the saponification of the methyl ester. The reaction mixture was acidified to pH 5.3 by the addition of 21.2 ml. of 1 N hydrochloric acid. The pH of the mixture was then adjusted to pH 3.5 with a 10 percent solution of citric acid. The reaction mixture was diluted with 100 ml. of water with stirring and the diluted mixture stored for several hours at 4° C. The reaction product was filtered and washed with water and dried over KOH pellets. The thin layer chromatogram on silica gel plates showed one spot material (chlorine-toluidine); $R_f$ value of 0.56 with $CHCl_3$: n-butanol:acetic acid: water (75:24:12:2). The NMR spectrum of the product showed the absence of O-methyl resonance at 3.6 p.p.m. in DMSO.

The saponified carbobenzoxy tetrapeptide was dissolved in 300 ml. of DMF and hydrogenated for 5 hours over 2.0 g. of 5% Pd on carbon at room temperature. The catalyst was filtered and the filtrate was evaporated in vacuo to yield 8.66 g. (75.2 percent) of L-valyl-L-glutaminyl - L - tryptophyl - L - leucine as a gummy residue. Thin layer chromatography on silica gel showed one spot material having an $R_f$ value of 0.37 with the solvent system ether:methanol:water (75:24:1). The NMR spectrum showed the absence of resonance attributable to the carbobenzoxy group. Quantitative amino acid analysis of the acid hydrolysate of the deblocked tetrapeptide gave: Glu (1.0), Leu (1.07), Val (0.96).

A mixture of 6.93 g. (12.73 mmole) of L-valyl-L-glutaminyl - L - tryptophyl - L - leucine, obtained as described above and 5.39 g. (14.01 mmole) of N-(3 - methyl-1-butyn - 3 - oxycarbonyl) - L - phenylalanine N-hydroxysuccinimide ester in 100 ml. of DMF was stirred at 0° C. for 5 hours and then allowed to warm to room temperature. The reaction was then stirred for 90 hours and thereafter evaporated in vacuo to a volume of about 20 ml. Upon the addition of ether the reaction product, N-(3-methyl - 1 - butyn - 3 - oxycarbonyl) - L - phenylalanyl - L - valyl - L - glutaminyl - L - tryptophyl - L-leucine, was obtained as a solid precipitate, 8.48 g. (83 percent yield) melting at about 170–175° C. The peptide product was crystallized from boiling methanol-water and dried over KOH pellets to give 3.3 g. (33 percent yield) melting at about 207–209° C. Thin layer chromatography revealed one spot (chlorine-toluidine) having an $R_f$ value of 0.44 with chloroform:methanol:acetic acid (25:24:1) and an $R_f$ value of 0.86 with tetrahydrofuran:cyclohexane: water (94:7:5). The nuclear magnetic resonance spectrum of the product in DMSO gave the following: δ0.84 (M, 14, $CH_3$-valine and leucine, βCH-valine, γCH-leucine), δ1.5 (S,β-CH₂-leucine), δ1.53 [S,6,C C—C(CH₃)₂], δ3.33 (S, C C—H), Δ10.78 (S, indole NH, —tryptophane). Quantitative amino acid analysis of the acid hydrolysate: Glu (1.0), Leu (1.04) Val (.97), Phe (.96).

Elemental analysis calculated for $C_{42}H_{55}N_7O_9$.— Theory (percent) C, 62.91; H, 6.91; N, 12.23; O, 17.95. Found (percent): C, 62.72; H, 7.00; N, 12.23; O, 18.20.

The hydrochloride salt of the above N-protected peptide (3.21 g., 4 mmole) was dissolved in 10 ml. of DMF and the solution added to a cold (0° C.) solution of 2,57 g. (5 mmole) of L-methionyl - L - asparaginyl-di-O-t-butyl-L-threoninate and 0.55 ml. (5 mmole) of N-methylmorpholine in 40 ml. of DMF with stirring. To the stirred reaction mixture maintained at a temperature of about 0° C. was added a solution of 0.69 g. (6 mmole) of N-hydroxysuccinimide in 5 ml. of DMF, and a solution of 0.824 g. (4 mmole) of dicyclohexylcarbodiimide in 5 ml. of DMF. The reaction mixture was stirred at 0° C. for 2 hours and at room temperature for 64 hours. The mixture was then cooled to 0° C. for several hours and the precipitate of dicyclohexylurea was filtered. The filtrate was evaporated in vacuo to a small volume and diluted with ethyl acetate. The diluted reaction mixture was then stored at 4° C. for several hours and the precipitated product was filtered. The product was washed successively with ether, water and then was dried over KOH pellets to give 4.38 g. of N-(3-methyl - 1 - butyn-3-oxycarbonyl) - L - phenylalanyl - L - valyl - L - glutaminyl - L - tryptophyl - L - leucyl - L - methionyl - L-asparaginyl-di-O-t-butyl-L-threoninate (87 percent yield) melting at about 221–225° C. dec. Thin layer chromatogram on silica gel showed one spot material (chlorine-toluidine) having an $R_f$ value of 0.88 with chloroform:methanol:acetic acid (75:24:1). Quantitative amino acid analysis of the acid hydrolysate of the product gave: Asp (1.0), Thr (0.95), Glu (0.99), Val (0.99), Met (0.97), Leu (1.03) and Phe (0.99).

Elemental analysis calculated for $C_{63}H_{93}N_{11}O_{14}S$.— Theory (percent): C, 60.03; H, 7.44; N, 12.22; O, 17.77; S, 2.54. Found (percent): C, 59.87; H, 7.26; N, 12.25; O, 18.04; S, 2.44.

The above reaction product (MBOC - L - phe - L - val- L - glu - L - trp - L - leu - L - met - L - asp-di-O-t-butyl-L - thr), was dissolved in 75 ml. of DMF and hydrogenated at room temperature in the presence of 1.19 g. of 5 percent Pd-C. The hydrogenolysis was followed by trapping the evolved carbon dioxide in a barium hydroxide trap. The hydrogenolysis appeared to be complete in 1.5 hours but was allowed to continue for 3 hours. The catalyst was filtered and the filtrate decolorized with carbon. The clarified reduction mixture was evaporated in vacuo to a residue. The residue was dissolved in DMF and the product precipitated by adding water dropwise to the solution. The product was filtered and was washed with water and dried in vacuo overnight to yield 1.77 g. (64.7 percent yield) melting at about 239–240.5° C. dec. A thin layer chromatogram on silica gel showed the product as one pot material having an $R_f$ value of 0.29 with chloroform:methanol:acetic acid (75:24:1). Quantitative amino acid analysis of the acid hydrolysate of the product, L-phe-L-val-glu - L-trp - L-leu - L - met-L-asp-di-O-t-butyl-L-thr, gave: Asp (1.13), thr (1.08), glu (1.0), val (0.98), met (1.13), leu (1.05), phe (1.16), trp (0.00).

Elementary analysis calculated for $C_{57}H_{87}N_{11}O_{12}S$.— Theory (percent): C, 59.51; H, 7.62; N, 13.39; O, 16.69; S, 2.79. Found (percent): C, 59.62; H, 7.85; N, 13.15; O, 16.70; S, 3.00.

EXAMPLE 33

Preparation of the 27–29 amino acid sequence of glucagon

Method A: N-(3-methyl-1-butyn - 3 - oxycarbonyl)-L-methionyl - L - asparaginyl-di-O-tert. - butyl - L - threoninate.—N-(3-methyl-1-butyn - 3 - oxycarbonyl)-L-methionine dicyclohexylamine salt, 8.8 g. (0.02 mole) was suspended in 50 ml. of ethyl acetate and the suspension was shaken once with 40 ml. of a 10 percent citric acid solution, twice with 40-ml. portions of a 10 percent solution of sodium chloride and then dried over anhydrous $Na_2SO_4$. The ethyl acetate was evaporated in vacuo and the residual oil dissolved in 40 ml. of tetrahydrofuran. L-Asparaginyl-di-O-tert-butyl-L-threoninate, 6.90 g. (0.02 mole) was added followed by 4.99 g. (0.022 mole) of N-ethoxycarbonyl - 2 - ethoxy - 1,2 - dihydroquinoline (EEDQ) and the reaction mixture stirred overnight at room temperature. The solution was evaporated in vacuo to an oil, and the oil dissolved in 50 ml. of ethyl acetate. The solution was washed three times with 50 ml. portions of a 10 percent citric acid solution and 10 percent sodium chloride solution and dried over anhydrous $Na_2SO_4$. The ethyl acetate was evaporated in vacuo to a white foam. The foam was dissolved in the minimum amount of ether and enough cyclohexane was added to precipitate the product as a fine powder. The precipitate was filtered and the filtrate evaporated in vacuo. The resulting amorphous product was collected to give 8.3 g. (71 percent). TLC: 1 spot (ninhydrin and chlorine-toluidine; $R_f$ .76 [butanol-acetic acid-water (100:10:30)].

Elemental analysis calculated for $C_{27}H_{46}N_4O_8S$.—Theory (percent): C, 55.27; H, 7.91; N, 9.55; O, 21.81; S, 5.46. Found (percent): C, 55.31; H, 8.19; N, 9.36; O, 21.89; S, 5.73.

L-methionyl - L - asparaginyl-di-O-tert.-butyl-L-threoninate.—N-(3-methyl-1-butyn - 3 - oxycarbonyl)-L-methionyl-L-asparaginyl-di-O-tert.-butyl-L-threoninate, 1.174 g. (2 mmole) was dissolved in 50 ml. of methanol. A small amount of 5% Pd/C, wet with water, was added to the solution and hydrogen was passed through the solution with shaking for 2.75 hours. The catalyst was filtered and the filtrate evaporated in vacuo to an oil. The oil is triturated successively with pentane and ether. Evaporation of the solvents in vacuo gave a white foamy solid, 0.585 g. (61.4 percent). TLC: 1 spot (ninhydrin and chlorine toluidine); $R_f$ .56 with [2-butanol-3 percent $NH_3$ (3:1)].

Elemental analysis calculated for $C_{21}H_{40}N_4O_6S$.—Theory (percent): C, 52.92; H, 8.46; N, 11.75; S, 6.73. Found (percent): C, 52.49; H, 8.55; N, 10.19; S, 6.34.

Concentration of the triturates gave an additional 0.192 g. (20 percent) of product contaminated with a small amount of starting material as determined by TLC.

Method B: N-(3-methyl-1-butyn - 3 - oxycarbonyl)-L-methionyl - L - asparaginyl-di-O-tert.-butyl - L - threoninate.—N-(3-methyl-1-butyn - 3 - oxycarbonyl)-L-methionine dicyclohexylamine salt, 4.41 g. (10 mmole) suspended in 75 ml. of ethyl acetate, was washed twice with 20-ml. portions of a 10 percent citric acid solution, twice with 20 ml. portions of water and then dried over anhydrous sodium sulfate. The dried solution was evaporated to a residual oil. The oil was dissolved in 20 ml. of DMF and the solution cooled to −15° C. To the solution was added 1.1 ml. (10 mmoles) of N-methylmorpholine and 1.23 ml. (9.5 mmoles) of isobutyl chloroformate. The mixture was stirred at −15° C. for 15 minutes and then treated with a previously prepared solution of 2.59 g. (7.5 mmoles) of L-asparaginyl-di-O-tert.-butyl-L-threoninate in 90 ml. of DMF precooled to −15° C. The mixture was stirred at −15° C. for 15 hours and was then treated with a cold solution of 0.21 g. of $NaHCO_3$ in 20 ml. of water and stirred for 30 minutes thereafter at −15° C. The solution was poured into 800 ml. of a saturated NaCl solution with vigorous stirring. The gummy product was collected, dissolved in ethyl acetate, washed with water and dried over anhydrous sodium sulfate. The dried solution was evaporated in vacuo to provide a clear oil which was crystallized from ether-pet-ether (30–60). The crystalline product was filtered and dried in vacuo over KOH to yield 2.58 g. (58.7 percent). TLC: one spot (chlorine-toluidine); $R_f$ .66 [2-butanol-3 percent ammonium hydroxide (3:1)]; NMR (DMSO) 1.05 (d,3,J=6H₂, βCH₃ Thr), 1.14 (S,9,O-t-butylether), 1.41 (S), O-t-butylester), 1.61

(S,6 C—C(CH₃)₂), 2.04 (S,3,SCH₃Met), 3.37 (S,1,H—C C), 4.08 (M,3, βCHThr, αCHThr, αCHMet), 4.71 (M,1,5,6 and 8H₂, αCH Asn), 6.94 and 7.37 (S, 1, CONH₂ Asn), 7.25 (d,1,J=8H₂, NHMet), 7.52 (d,1,J=8, NH Asn), 8.25 (d,1,J=8, NHThr).

Elemental analysis calculated for C₂₇H₄₆N₄O₈S.—Theory (percent): C, 55.27; H, 7.91; N, 9.55; O, 21.81; S, 5.46. Found (percent): C, 55.33; H, 8.15; N, 9.27; O, 22.01; S, 5.24.

EXAMPLE 34

N - (1-ethynylcyclohexyl-1-oxycarbonyl)-L-methionyl-L-asparaginyl-di-O-t-butyl-L-threoninate was prepared according to the foregoing procedure described in Example 33.

Elemental analysis for C₃₀H₅₀N₄O₈S.—Theory (percent: C, 57.48; H, 8.04; N, 8.94; O, 20.42; S, 5.11. Found (percent): C, 57.20; H, 7.84; N, 8.74; O, 20.67; S, 5.35.

EXAMPLE 35

N-(1-phenyl - 3 - methyl-1-butyn - 3 - oxycarbonyl)-L-methionyl - L - asparaginyl-di-O-t-butyl-L-threoninate was prepared according to the procedures described in Example 33. Melting point, 72.5–75° C.

Elemental analysis for C₃₃H₅₀N4O₈S.—Theory (percent): C, 59.80; H, 7.60; N, 8.45; S, 4.84. Found (percent): C, 59.55; H, 7.81; N, 8.36; S, 4.89.

Hydrogenolysis of the above described protected tripeptides of Examples 34 and 35 according to the procedure described by Method A provides the tripeptide, L-methionyl-L-asparaginyl-di-O-t-butyl-L-threoninate, the 27–29 amino acid fragment of glucagon.

EXAMPLE 36

N-(3-methyl-1-butyn - 3 - oxycarbonyl)-O-t-butyl-L-seryl-L-arginyl-L-arginyl-L-alanyl - L - glutaminyl-L-t-butyl-L-aspartyl - L - phenylalanyl-L-valyl-L-glutaminyl-L-tryptophyl-L-leucyl - L - methionyl-L-asparaginyl-di-O-t-butyl-L-theoninate dihydrochloride.—To a solution of 1.438 g. (1.25 mmole) of L-phenylalanyl-L-valyl-L-glutaminyl-L-tryptophyl-L-leucyl - L - methionyl-L-asparaginyl-L-gutaminyl-O-t-butyl-L-aspartate dihydrochloride in tained at a temperature of —15° C. is added a solution of 1.921 g. (1.87 mmole) of N-(3-methyl-1-butyn-3-oxycarbonyl)-O-t-butyl-L-seryl-L-arginyl - L - arginyl-L-alanyl-L-gutaminyl-O-butyl-L-aspartate dihydrochloride in 8 ml. of DMF. To the stirred reaction mixture was added 0.431 g. (3.74 mmole) of N-hydroxysuccinimide, 0.258 g. (1.25 mmole) of dicyclohexylcarbodiimide and 7 ml. of DMF. The reaction mixture was stirred for 3 hours at —15° C. at 4° C. for 90 hours and thereafter at room temperature for 24 hours. The reaction mixture was filtered and the filtrate diluted with ethyl acetate with the formation of a precipitate. The precipitate was filered and crystallized 3 times from methanol-ethyl acetate to yield 0.615 g. (22 percent yield) of N-(3-methyl-1-butyn-3-oxycarbonyl)-O-t-butyl-L-Ser-L-Arg - L - Arg-L-Ala-L-Glu-O-t-butyl-L-Asp-L-Phe - L - Val-L-Glu-L-Trp-L-Lew-L-Met-L-Asn-di-O-t-butyl-L-Thr; 2HCl.

A quantitative amino acid analysis of the acid hydrolysate of the reaction product gave the following relative proportions of amino acids: Thr(0.98), Asp(2.2), Met(0.95), Lev(1.0), Glu(2.2), Val(0.98), Ph(0.93), Ala(1.2), Arg(2.2), Ser(1.00)

EXAMPLE 37

N-(1-chloro - 3 - methyl-1-butyn-3-oxycarbonyl)-L-methionyl-L-asparaginyl-di-O-t-butyl - L - threoniate.—A suspension of 1.8 g. (4 mmole) of N-(1-chloro-3-methyl-1-butyn-3-oxycarbonyl)-L-methionine dicyclohexylamine salt in 10 ml. of ethyl acetate was shaken twice with 10 ml. of a 10 percent solution of citric acid and once with a 10 percent salt solution. The solution obtained was dried over sodium sulfate and the dried solution was evaporated in vacuo to a residual oil. The oil was dissolved in 10 ml. of THF and 1.38 g. (4 mmole) of L-asparaginyl-di-O-t-butyl-L-threoninate and 0.998 g. (4.4 mmole) of N-ethoxy-3-ethoxy-1,2 - dehydroguinoline(EEDQ) were added to the solution. The reaction mixture was stirred overnight and was then evaporated to dryness in vacuo to a residual foam. The residue was dissolved in 20 ml. of ethyl acetate and the solution was washed three times each with 20 ml. portions of a 10 percent citric acid solution and a 10 percent salt solution. The washed solution was dried and evaporated to yield 1.09 g. (44 percent yield) of the N-protected tripeptide.

Elementary analysis for: C₂₇H₄₆O₈SCl.—Theory (percent): C, 52.12; H, 7.45; N, 9.00; O, 20.57; S, 5.15; Cl, 5.70. Found (percent): C, 52.24; H, 7.39; N, 8.75; O, 20.42; S, 4.90; Cl, 5.68.

I claim:
1. The compound of the formula

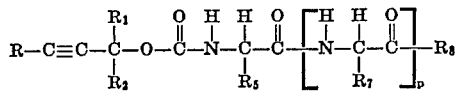

wherein

R is hydrogen, chloro, phenyl, phenyl substituted by $C_1$–$C_4$ alkyl, $C_1$–$C_4$ alkoxy or halogen;

$R_1$ taken separately is hydrogen or $C_1$–$C_4$ alkyl;

$R_2$ taken separately is $C_1$–$C_4$ alkyl; and $R_1$ and $R_2$ when taken together with the carbon atom to which they are attached form a 5, 6 or 7 membered carbocyclic ring;

$R_5$ and $R_7$ independently are hydrogen, $C_1$–$C_4$ lower alkyl, hydroxymethyl, protected-hydroxymethyl, 1-hydroxyethyl, protected-1-hydroxyethyl, 3-aminopropyl, protected-3-aminopropyl, 4-aminobutyl, protected-4-aminobutyl, mercaptomethyl, protected-mercaptomethyl, methylthiomethyl, carboxymethyl, protected-carboxymethyl, 2-carboxyethyl, protected-2-carboxyethyl, 2-carboxamidoethyl, 3 - guanidinopropyl, 2-imidazolylmethyl, protected 2-imidazolylmethyl, 3-indolylmethyl, protected 3-indolylmethyl, phenyl, 4-hydroxyphenyl or protected 4-hydroxyphenyl;

$R_8$ is hydroxy, methoxy, ethoxy, t-butoxy, 2,2,2-trichloroethoxy, benzyloxy, 4-nitro-benzyloxy, 2,4,5-trichlorophenoxy, pentachlorophenethoxy, pentafluorophenoxy, or amino;

p is 0 or an integer from 1 to 14 provided that when p is greater than 1, then the meanings of $R_7$ as between the individual amino acid residues comprising the chain can be the same or different.

2. The compound of claim 1, wherein p is an integer from 1 to 4.

3. The compound of claim 2, said compound being N-(3-methyl-1-butyn-3-oxycarbonyl) - L - tryptophyl-L-leucyl methyl ester.

4. The compound of claim 2, said compound being N-3-methyl - 1 - butyn-3-oxycarbonyl)-S-benzhydryl-L-cysteinylglycine ethyl ester.

5. The compound of claim 2, said compound being N-(3-methyl-1-butyn - 3 - oxycarbonyl)-S-trityl-L-cysteinylglycine ethyl ester.

6. The compound of claim 2, said compound being N-(3-methyl-1-butyn - 3 - oxycarbonyl)-L-phenylalanyl-S-trityl-L-cysteinylglycine ethyl ester.

7. The compound of claim 2, said compound being N-(1-phenyl-3-methyl-1-butyn - 3 - oxycarbonyl)-L-methionyl-L-asparaginyl-di-O-t-butyl-L-threonine.

8. The compound of claim 2, said compound being N-(3-methyl - 1 - butyn-3-oxycarbonyl-L-phenylalanyl-L-valyl-L-glutaminyl-L-tryptophenyl-L-leucine.

9. The compound of claim 2, said compound being N-(3-methyl-1-butyn - 3 - oxy-carbonyl)-L-tryptophenyl-L-methionyl-L-aspartyl-L-phenylalanine amide.

10. The compound of claim 1 wherein p is an integer from 5 to 14.

11. The compound of claim 10, said compound being N-(3-methyl - 1 - butyn-3-oxycarbonyl)-O-t-butyl-L-seryl-L-arginyl-L-arginyl-L-alanyl - L - glutaminyl-β-t-butyl-L-aspartic acid dihydrochloride.

12. The compound of claim 10, said compound being N-(3-methyl-1-butyn - 3 - oxycarbonyl)-S-benzyl-L-cysteinyl-O-t-butyl-L-seryl-L-asparaginyl - L - leucyl-O-t-butyl-L-serinyl-L-threonine.

13. The compound of claim 10, said compound being N-(3-methyl - 1 - butyn-3-oxycarbonyl)-L-phenylalanyl-L-valyl-L-glutaminyl - L - tryptophenyl-L-leucyl-L-methionine-L-asparaginyl-di-O-t-butyl-L-threonine.

14. The compound of claim 10, said compound being N-(3-methyl - 1 - butyn-3-oxycarbonyl)-O-t-butyl-L-seryl-L-arginyl-L-arginyl-L-alanyl-L-glutaminyl - O - t-butyl-L-aspartyl-L-phenylalanyl - L - valyl-L-glutaminyl-L-tryptophyl-L-leucyl - L - methionyl-L-asparaginyl-di-O-t-butyl-L-threonine dihydrochloride.

15. The compound of claim 10, said compound being N-(3 - methyl - 1 - butyn-3-oxycarbonyl)-O-t-butyl-L-tyrosyl - O - t-butyl-L-seryl-L-E-t-butyloxycarbamyl-L-lysyl-O-t-butyl-L-tyrosyl-L-leucyl - β - O-t-butyl-L-aspartic acid.

16. The compound of claim 10, said compound being N-(3-methyl - 1 - butyn-3-oxycarbonyl)-L-histidyl-L-seryl-L-asparaginyl-glycyl - L - threonyl-L-phenylalanyl-L-threonyl-L-seryl-L-glutamyl-L-leucyl-L-seryl - L - arginyl-L-leucyl-L-arginyl-L-aspartic acid amide.

17. The compound of claim 1 wherein p is 0.

18. The compound of claim 17, said compound being N-(3-methyl-1-butyn-3-oxycarbonyl)-L-methionine.

19. The compound of claim 17, said compound being N-(3-methyl-1-butyn-3-oxycarbonyl)-L-phenylalanine.

20. The compound of claim 17, said compound being N-(3-methyl-1-butyn-3-oxycarbonyl)-D-α-phenylglycine.

21. The compound of claim 17, said compound being N-(3-methyl-1-butyn-3-oxycarbonyl)-S-trityl-L-cysteine.

22. The compound of claim 17, said compound being N-(3-methyl - 1 - butyn-3-oxycarbonyl)-L-methionine 2,4,5-trichlorophenyl ester.

23. The compound of claim 17, said compound being N-(3-methyl-1-butyn-3-oxycarbonyl)-O-t-butyl-L-serine.

24. The compound of claim 16, said compound being N-(3-methyl-1-butyn-3 - oxycarbonyl)-O-t-butyl-L-threonine.

25. In the process for preparing peptides consisting of α-amino acid residues which comprises (1) reacting an amino-protected α-amino acid as (a) an active ester, or
(b) as an acyl halide in the presence of a hydrogen halide acceptor, or
(c) as the free acid in the presence of a condensing agent, with an α-amino acid or an N-terminal amino peptide consisting of α-amino acid residues; (2) removing the amino-protecting group from the resulting peptide; and (3) successively reacting the then available amino function of the newly formed peptide with an amino-protected α-amino acid and subsequently removing the amino-protecting group from the newly formed peptide, the process improvement which comprises, employing as the amino-protecting group an alkynylcarbinyloxycarbonyl group of the formula

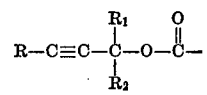

wherein

R is hydrogen, chloro, phenyl or phenyl substituted by $C_1-C_4$ alkyl, $C_1-C_4$ alkoxy or halogen;

$R_1$ taken separately is hydrogen or $C_1-C_4$ alkyl;

$R_2$ taken separately is $C_1-C_4$ alkyl; and $R_1$ and $R_2$ when taken together with the carbon atom to which they are attached form a 5, 6 or 7 membered carbocyclic ring.

26. The process of claim 25 wherein the amino-protecting group is the 3-methyl - 1 - butyn-3-oxycarbonyl group of the formula

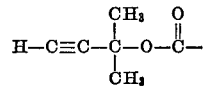

27. The process of claim 25 wherein the alkinylcarbinyloxycarbonyl amino-protecting group is removed from the alkinylcarbinyloxycarbonyl protected peptide by reacting said peptide in an inert solvent with hydrogen at a temperature between 15 and 45° C. in the presence of palladium catalyst.

No references cited.

ELBERT L. ROBERTS, Primary Examiner

U.S. Cl. X.R.

260—309; 326; 389, 463, 471, 479, 481, 482

UNITED STATES PATENT OFFICE
CERTIFICATE OF CORRECTION

Patent No. 3,769,271              Dated October 30, 1973

Inventor(s) George Lee Southard

It is certified that error appears in the above-identified patent and that said Letters Patent are hereby corrected as shown below:

Column 3, line 38, "agents" should read --agent--. Column 4, line 48, "alkyl" should read --alkyl"--. Column 5, line 42, "trimethylamine" should read --triethylamine--; line 70, "3-mehtyl-" should read -- 3-methyl- --. Column 6, line 58, "of N-protected" should read --of the N-protected--. Column 10, in the heading of Table II, "acid" should read --acids--; in that portion of the structural formula at line 5 reading

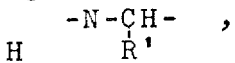

should read

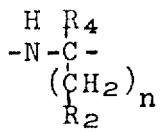

line 28, "emntioned" should read --mentioned--. Column 11, line 11, insert --the-- after "Following". Column 12, in that portion of the structural formula reading

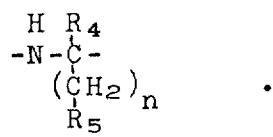

should read $$-N-\overset{H}{\underset{(\underset{R_5}{C}H_2)_n}{\overset{R_4}{C}}}- \quad .$$

Column 16, in footnote 3 of Table III, "1-ehtyny" should read -- 1-ethynyl --. Column 17, line 54, "1562" should read --15.62--. Column 18, line 18, "pentyl" should read --pentyn--; line 69, "4.46" should read --4.66--; after line 75, add --ether and the aqueous layer was acidified to pH 1-2 by--. Column 21, line 62, "yiel" should read --yield--. Column 22, line 43, "acidized" should read --acidified--. Column 28, line 7, "saturation" should read --saturated

UNITED STATES PATENT OFFICE
CERTIFICATE OF CORRECTION

Patent No. 3,769,271          Dated October 30, 1973

Inventor(s) George Lee Southard          Page 2

It is certified that error appears in the above-identified patent and that said Letters Patent are hereby corrected as shown below:

solution--. Column 31, line 45, "L-gutaminyl-O-t-butyl-L-aspartate dihydrochloride in" should read --di-O-t-butyl-L-threoninate in 15 ml. of DMF maintained--; line 46, "tained" should be deleted; line 57, "filered" should read --filtered--

Signed and sealed this 23rd day of July 1974.

(SEAL)
Attest:

McCOY M. GIBSON, JR.
Attesting Officer

C. MARSHALL DANN
Commissioner of Patents